US008150791B2

(12) United States Patent
Brown

(10) Patent No.: US 8,150,791 B2
(45) Date of Patent: Apr. 3, 2012

(54) BENEFITS SERVICES PRIVACY ARCHITECTURE

(76) Inventor: Hartwell Brown, Palo Alto, CA (US)

( * ) Notice: Subject to any disclaimer, the term of this patent is extended or adjusted under 35 U.S.C. 154(b) by 444 days.

(21) Appl. No.: 12/253,180

(22) Filed: Oct. 16, 2008

(65) Prior Publication Data
US 2009/0106300 A1 Apr. 23, 2009

Related U.S. Application Data

(60) Provisional application No. 60/999,632, filed on Oct. 19, 2007.

(51) Int. Cl.
G06F 17/00 (2006.01)

(52) U.S. Cl. ........... 706/48; 706/45; 704/270; 705/14.4; 705/80; 707/758; 709/229; 715/745; 379/207.02

(58) Field of Classification Search .................. None
See application file for complete search history.

(56) References Cited

U.S. PATENT DOCUMENTS

| 5,991,735 | A  | * | 11/1999 | Gerace ........................... 705/10 |
| 6,021,403 | A  | * | 2/2000  | Horvitz et al. .................. 706/45 |
| 6,088,731 | A  | * | 7/2000  | Kiraly et al. ................... 709/229 |
| 6,233,570 | B1 | * | 5/2001  | Horvitz et al. .................. 706/11 |
| 6,260,035 | B1 | * | 7/2001  | Horvitz et al. .................. 706/60 |
| 6,262,730 | B1 | * | 7/2001  | Horvitz et al. ................. 715/707 |
| 6,307,544 | B1 | * | 10/2001 | Harding ........................ 715/709 |
| 6,560,576 | B1 | * | 5/2003  | Cohen et al. .................. 704/270 |
| 6,597,314 | B1 | * | 7/2003  | Beezer et al. .................. 715/812 |
| 7,020,842 | B1 | * | 3/2006  | DeStefano et al. ........... 715/741 |
| 7,120,590 | B1 |   | 10/2006 | Eisen et al. |
| 7,124,093 | B1 |   | 10/2006 | Graham et al. |
| 7,136,906 | B2 |   | 11/2006 | Giacalone, Jr. |
| 7,149,958 | B2 |   | 12/2006 | Landsman et al. |
| 7,170,624 | B2 |   | 1/2007  | Chalstrom et al. |
| 7,249,059 | B2 |   | 7/2007  | Dean et al. |
| 7,293,063 | B1 | * | 11/2007 | Sobel ............................ 709/206 |
| 7,302,696 | B1 |   | 11/2007 | Yamamoto |
| 7,305,442 | B1 |   | 12/2007 | Lundy |
| 7,313,784 | B2 | * | 12/2007 | Hawley et al. ................ 717/110 |
| 7,324,957 | B2 |   | 1/2008  | Boys |
| 7,337,127 | B1 |   | 2/2008  | Smith et al. |
| 7,363,254 | B2 |   | 4/2008  | Skinner |
| 7,386,485 | B1 |   | 6/2008  | Mussman et al. |
| 7,421,645 | B2 |   | 9/2008  | Reynar |

(Continued)

OTHER PUBLICATIONS

Panton et al, "Common Sense Reasoning From Cyc to Intelligent Assistant", Springer-Verlag Berlin Heidelberg, 2006.*

(Continued)

Primary Examiner — Hung Le
(74) Attorney, Agent, or Firm — Alleman Hall McCoy Russell & Tuttle LLP

(57) ABSTRACT

A system and method of presenting benefits to a user of a computing device is provided. The method may include detecting user activities via a computer program executed on the computing device, storing a list of detected user activities in a user history in the computing device, and receiving a list of predefined benefits from at least one remote server. Each of the predefined benefits may include an associated trigger user activity. The method may further include storing the list of predefined benefits in the computing device, and determining a predefined benefit to present to the user based at least on the presence of a trigger user activity for the predefined benefit in the user history, via the computer program in the computing device. The method may further include presenting a matched predefined benefit to the user.

19 Claims, 29 Drawing Sheets

VALET GENERAL COMMUNICATION STRUCTURE

U.S. PATENT DOCUMENTS

| | | |
|---|---|---|
| 2002/0055912 A1* | 5/2002 | Buck .............................. 705/76 |
| 2003/0080997 A1* | 5/2003 | Fuehren et al. ............... 345/744 |
| 2003/0165223 A1* | 9/2003 | Timmins et al. ......... 379/207.02 |
| 2004/0215509 A1* | 10/2004 | Perry .............................. 705/14 |
| 2005/0038699 A1* | 2/2005 | Lillibridge et al. ............. 705/14 |
| 2007/0157227 A1 | 7/2007 | Carpenter et al. |
| 2007/0260596 A1* | 11/2007 | Koran et al. ...................... 707/5 |
| 2008/0059308 A1* | 3/2008 | Gerken ........................... 705/14 |
| 2009/0006197 A1* | 1/2009 | Marcuvitz ....................... 705/14 |

OTHER PUBLICATIONS

Bollacker et al, "CiteSeer: An Autonomous Web Agent for Automatic Retrieval and Identification of Interesting Publications", ACM, May 1998.*

* cited by examiner

FIG. 1 - VALET COMPUTER SYSTEM, NETWORK, EXTERNAL DEVICE
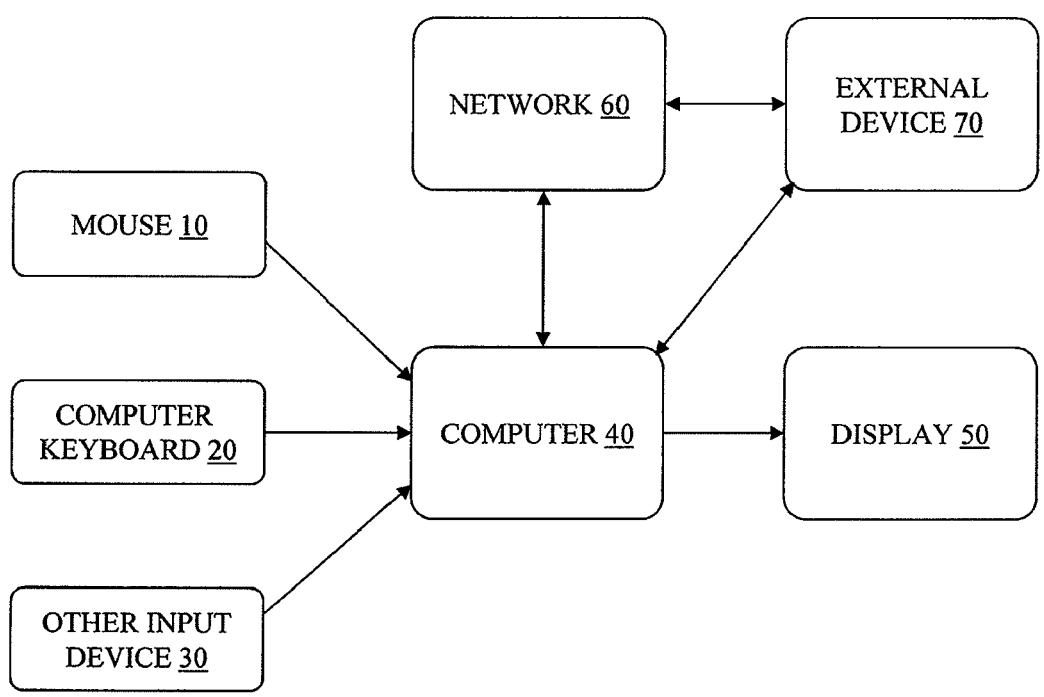

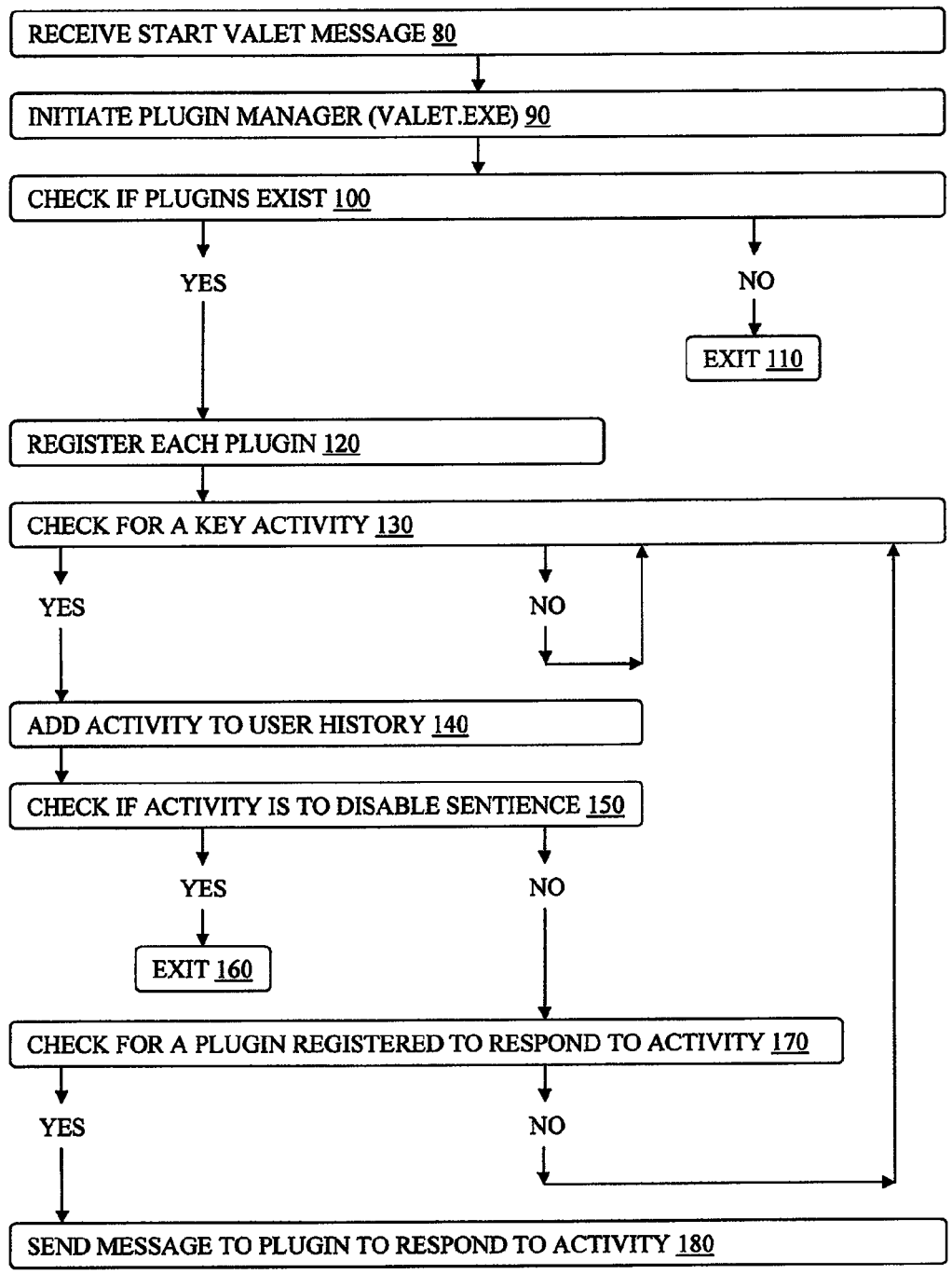
FIG. 2 - VALET OVERVIEW

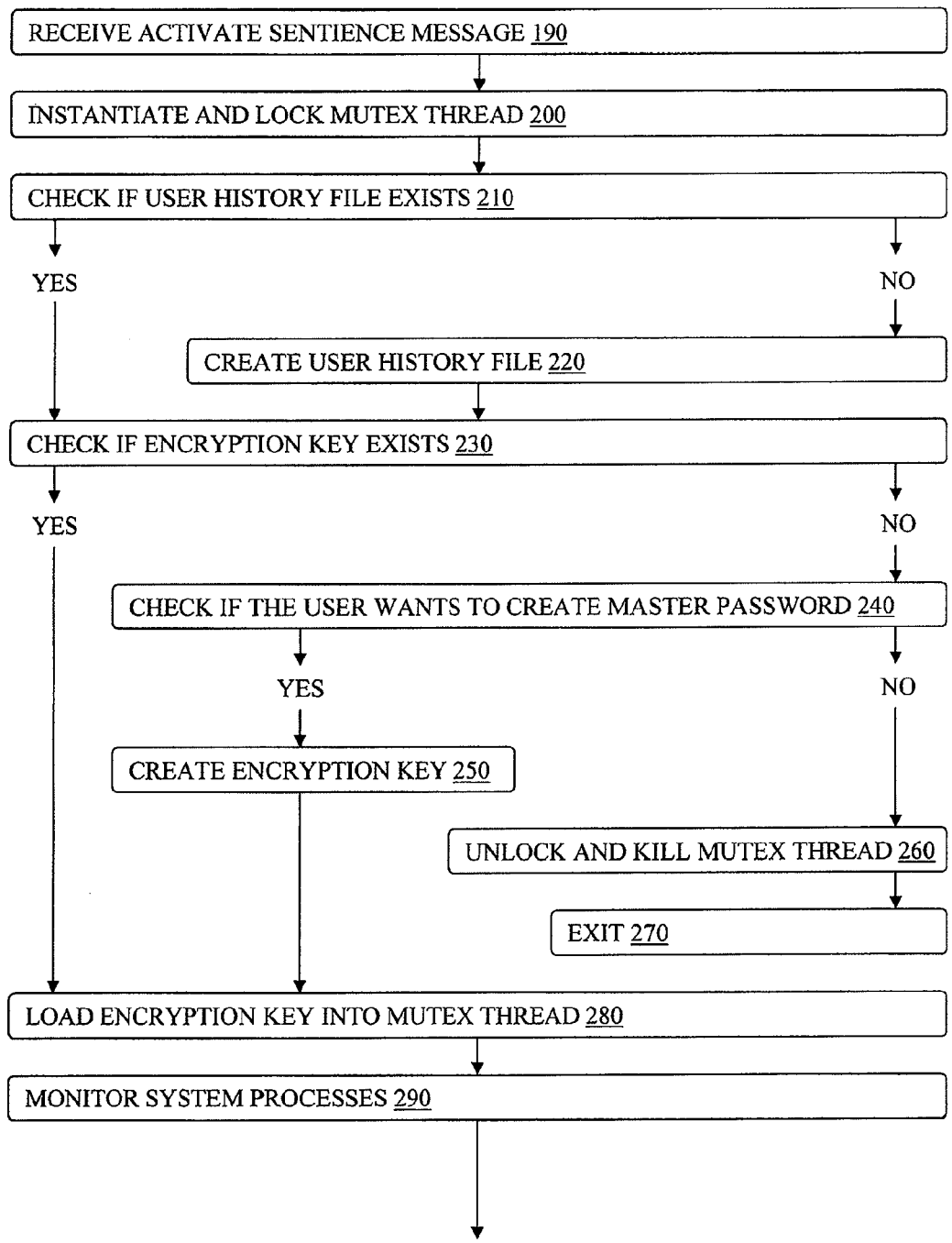
FIG. 3A – SENTIENCE

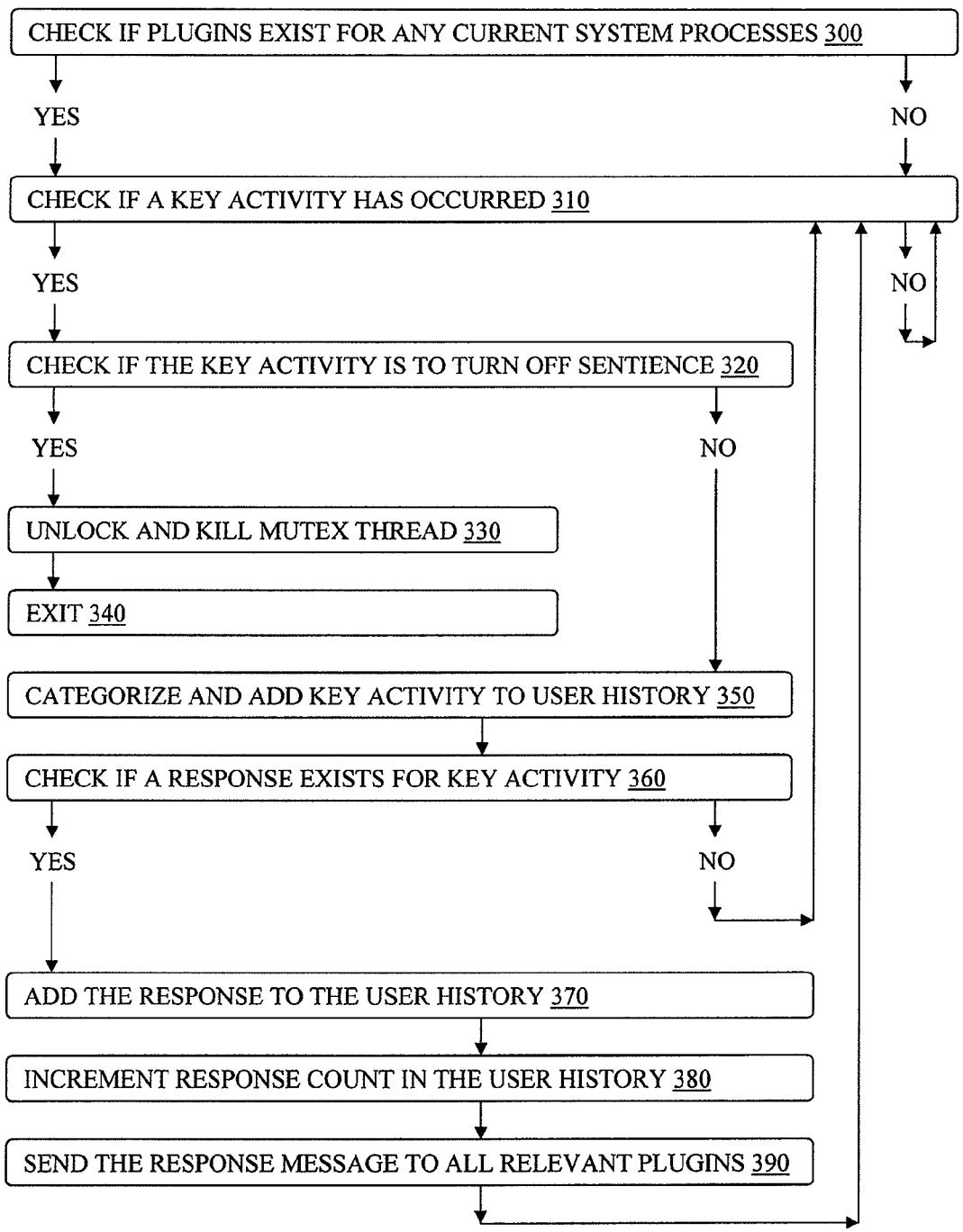
FIG. 3B – SENTIENCE

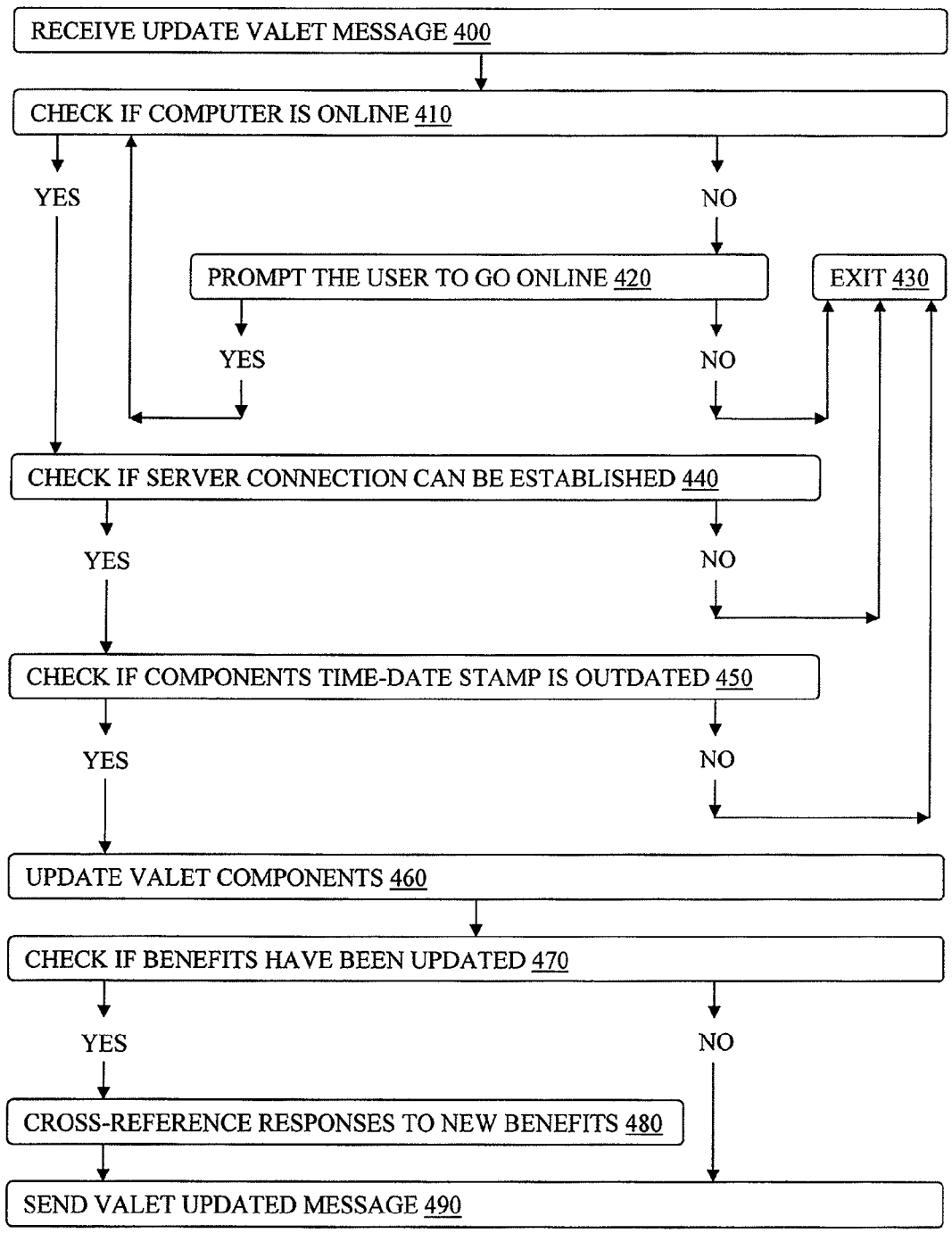
FIG. 4 - UPDATE VALET

FIG. 5 - VALET GENERAL COMMUNICATION STRUCTURE
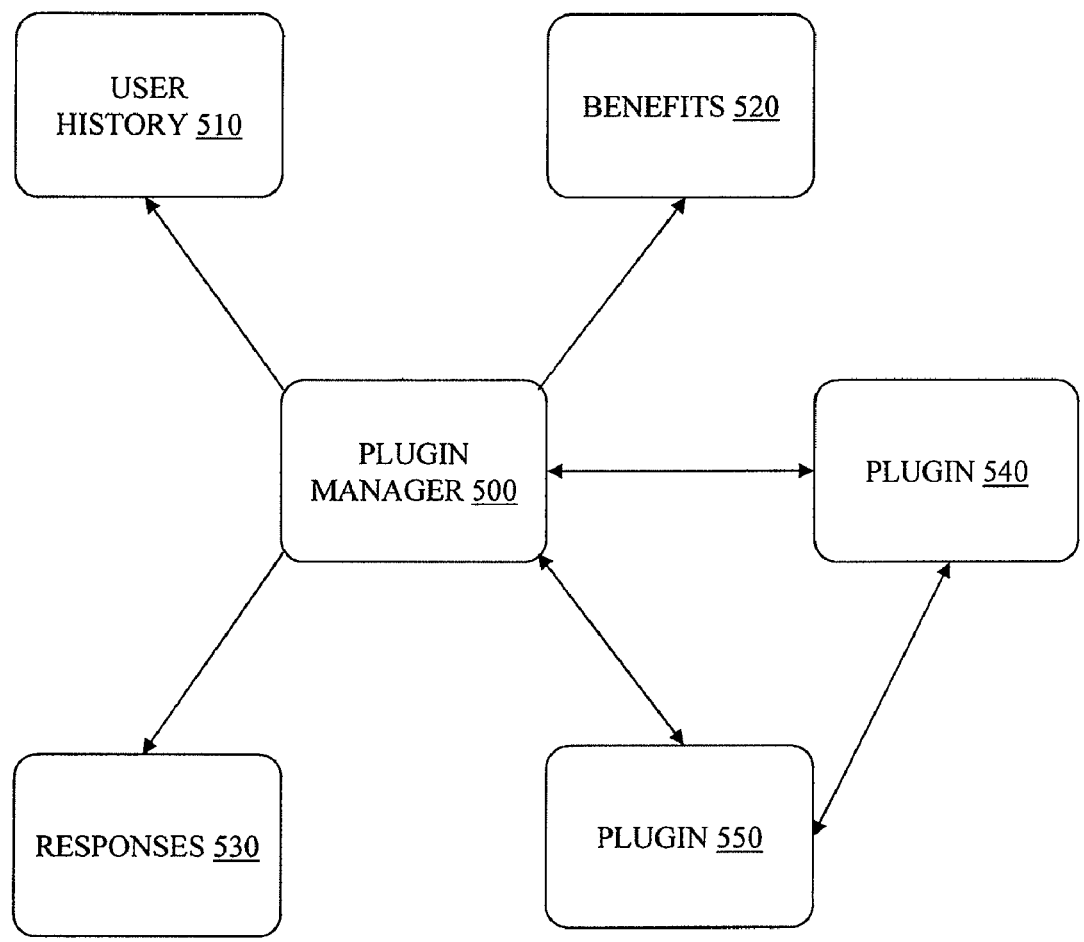

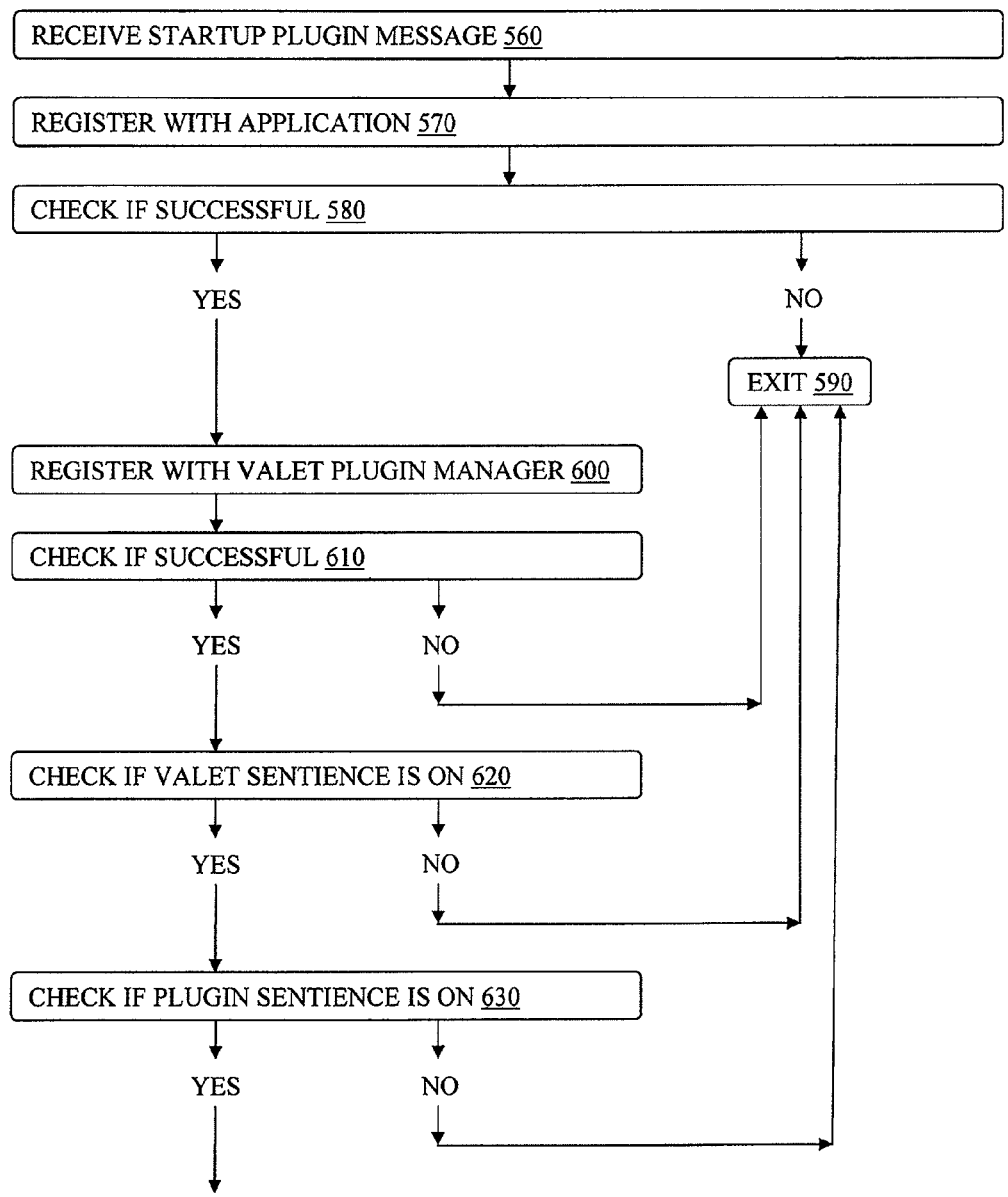
FIG. 6A - VALET PLUGIN

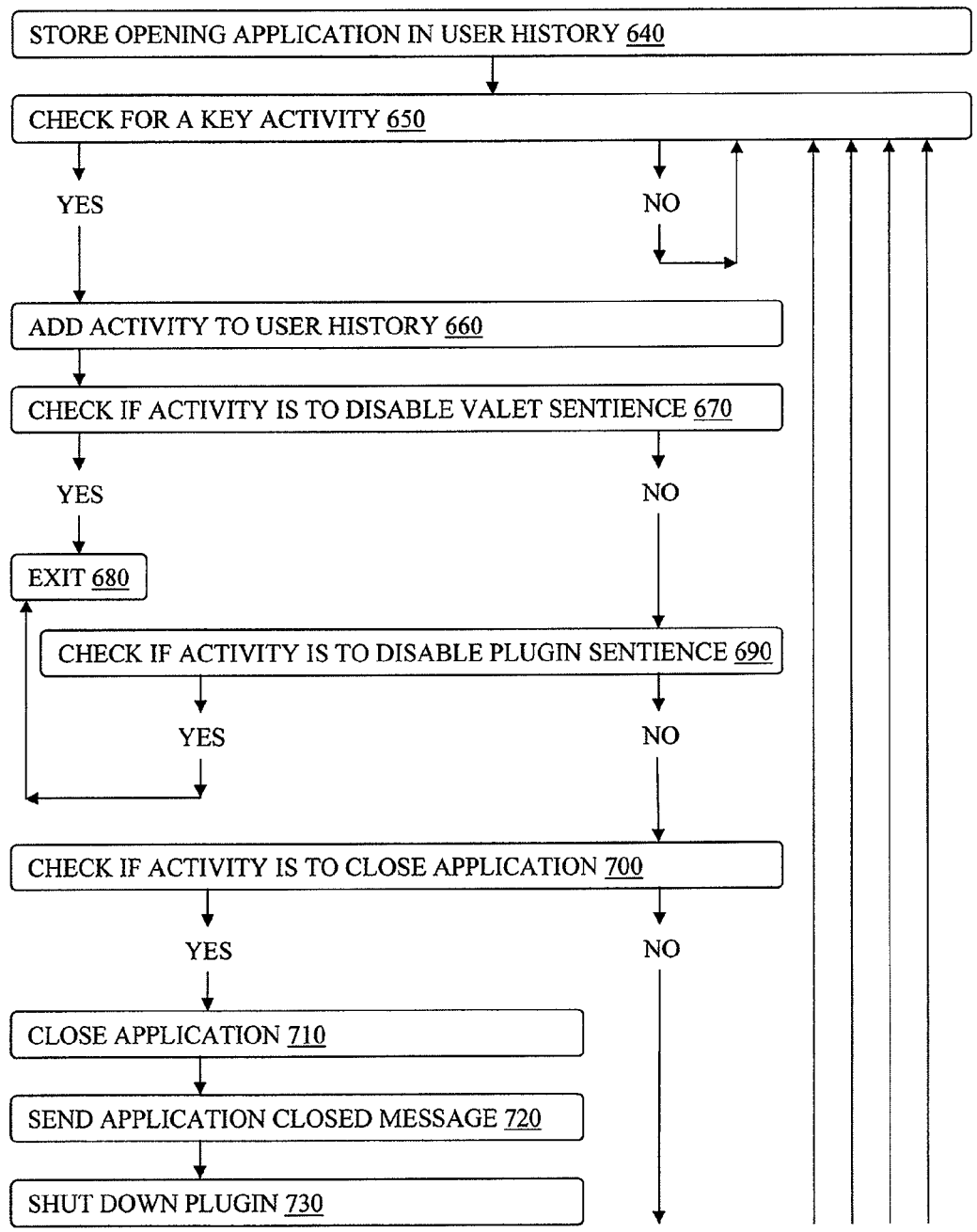
FIG. 6B - VALET PLUGIN

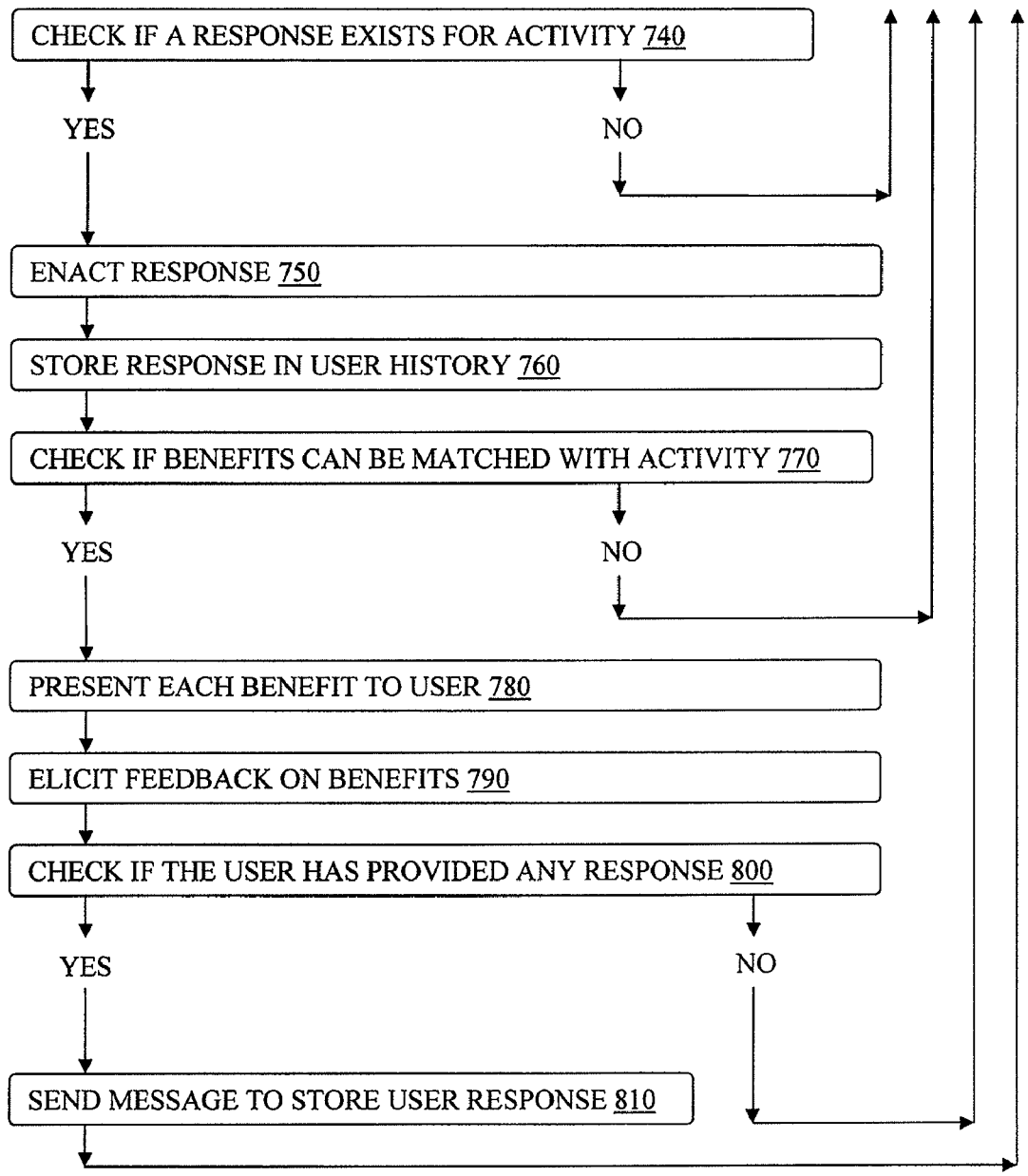
FIG. 6C - VALET PLUGIN

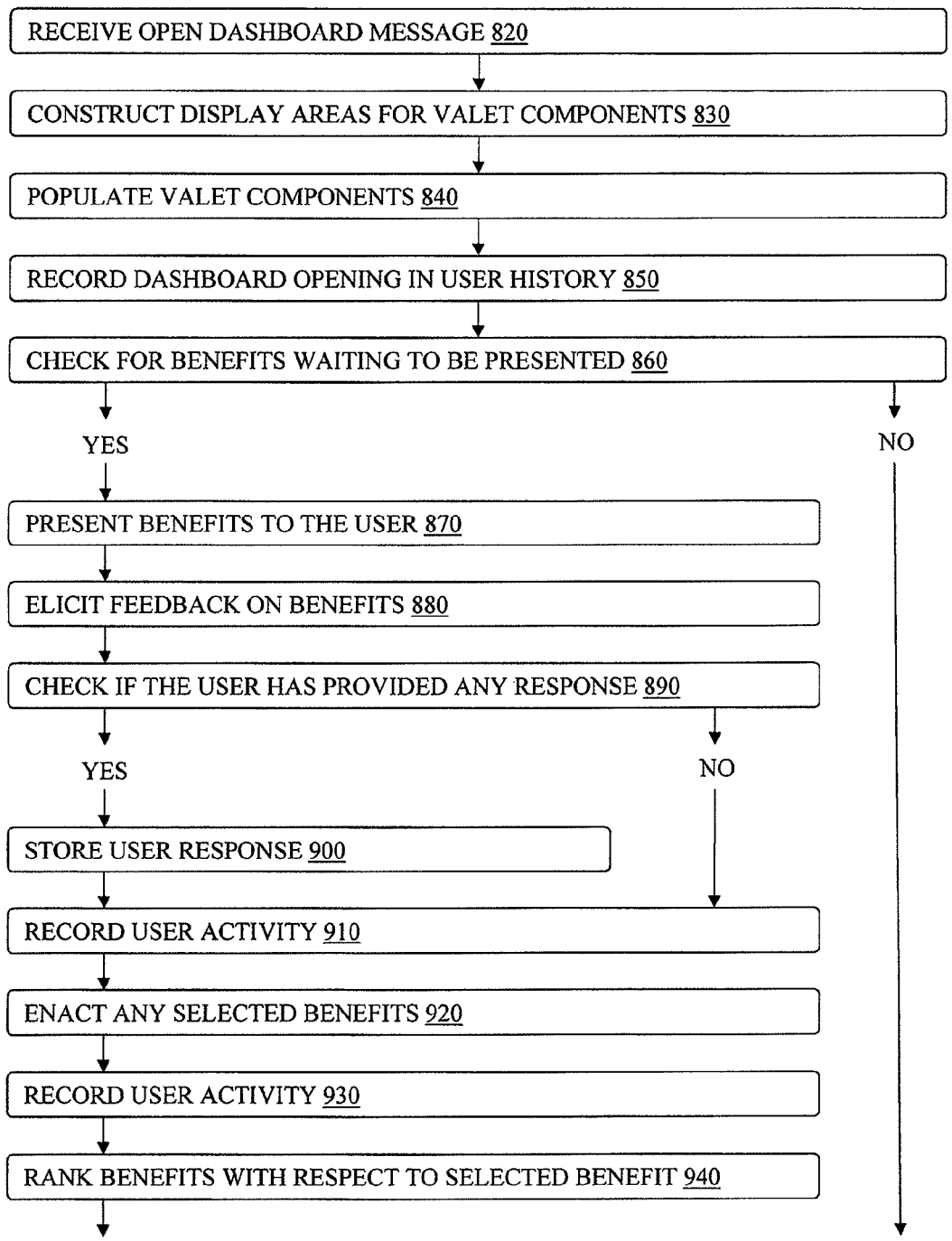
FIG. 7A - VALET DASHBOARD

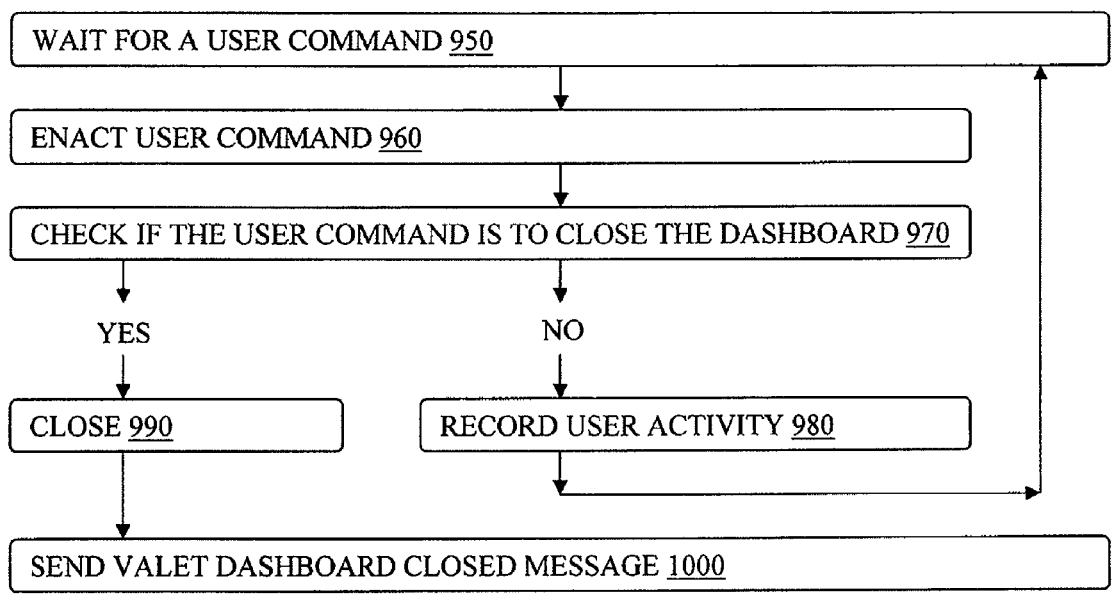
FIG. 7B - VALET DASHBOARD

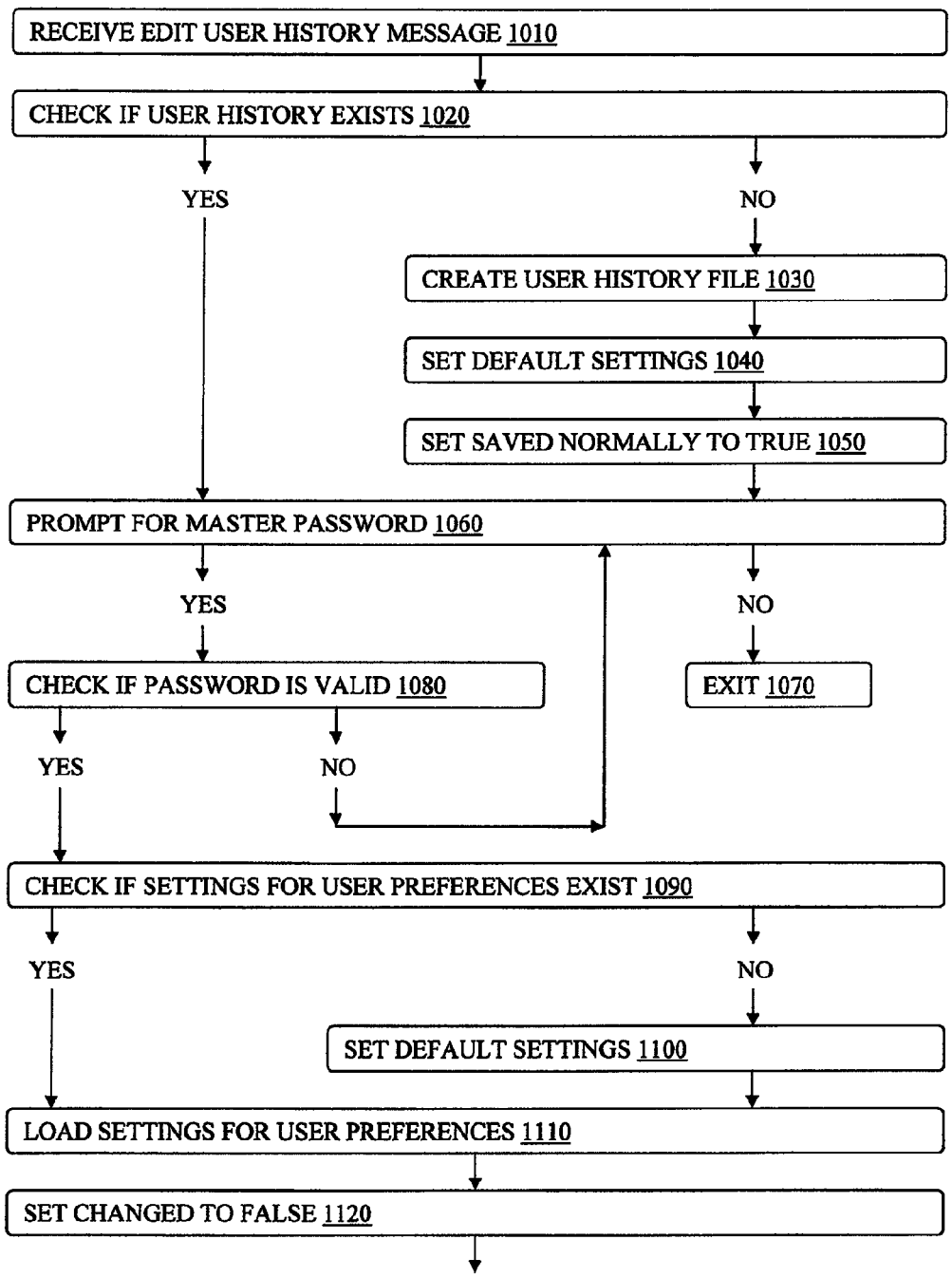
FIG. 8A - EDIT USER HISTORY

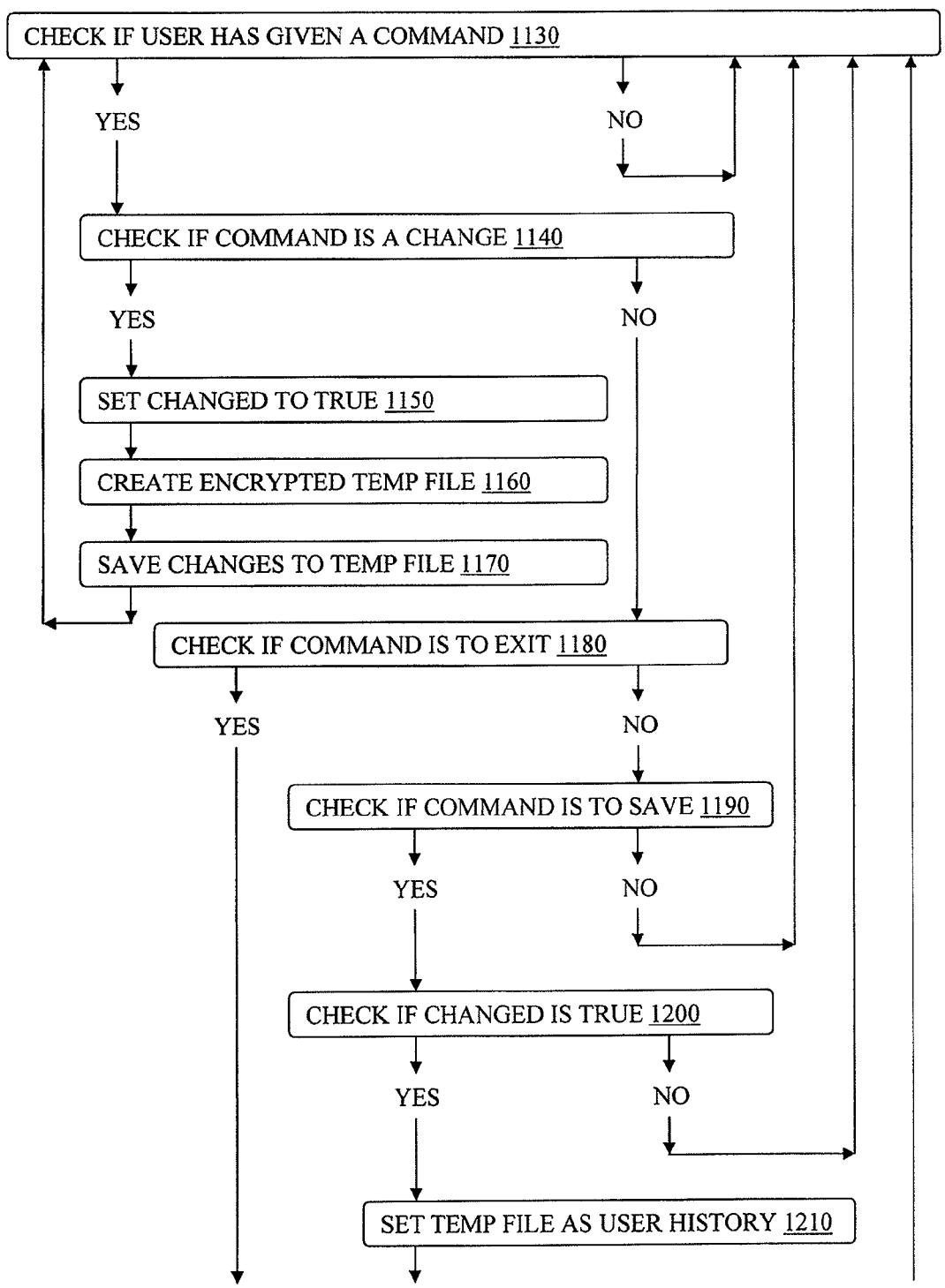
FIG. 8B - EDIT USER HISTORY

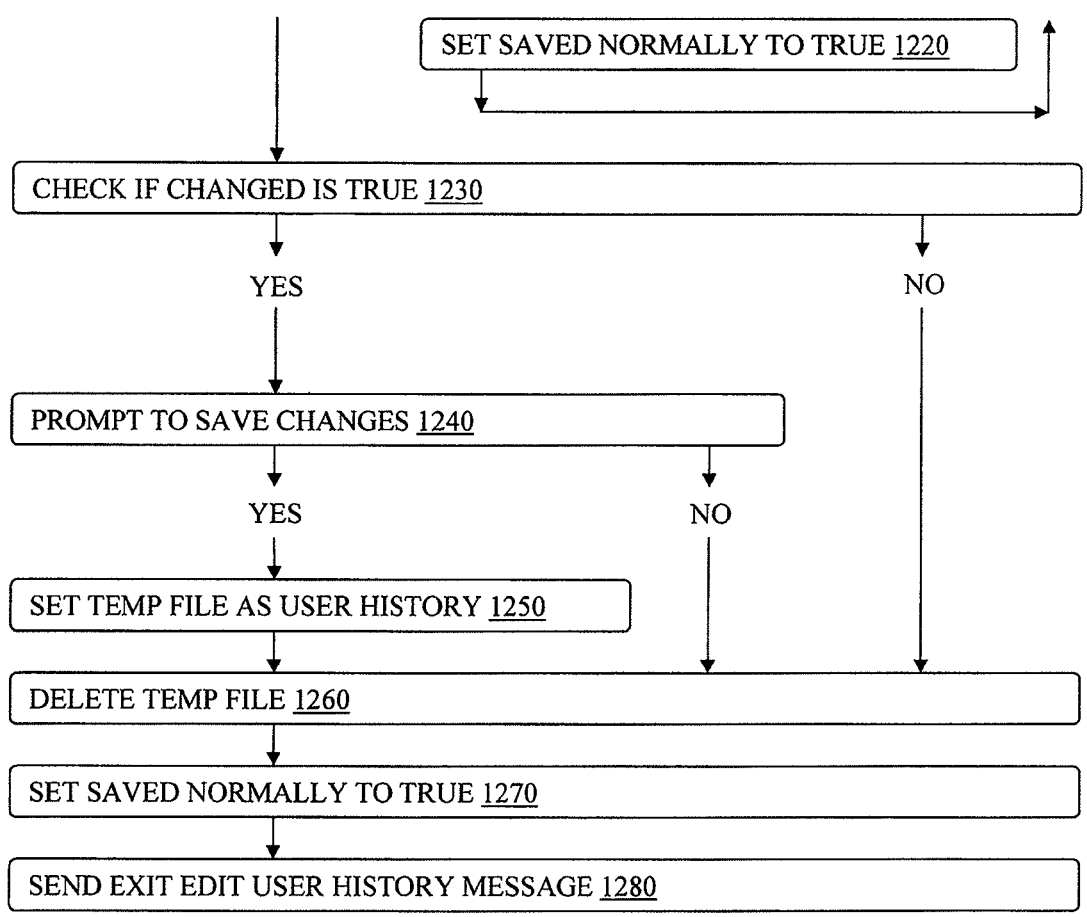
FIG. 8C - EDIT USER HISTORY

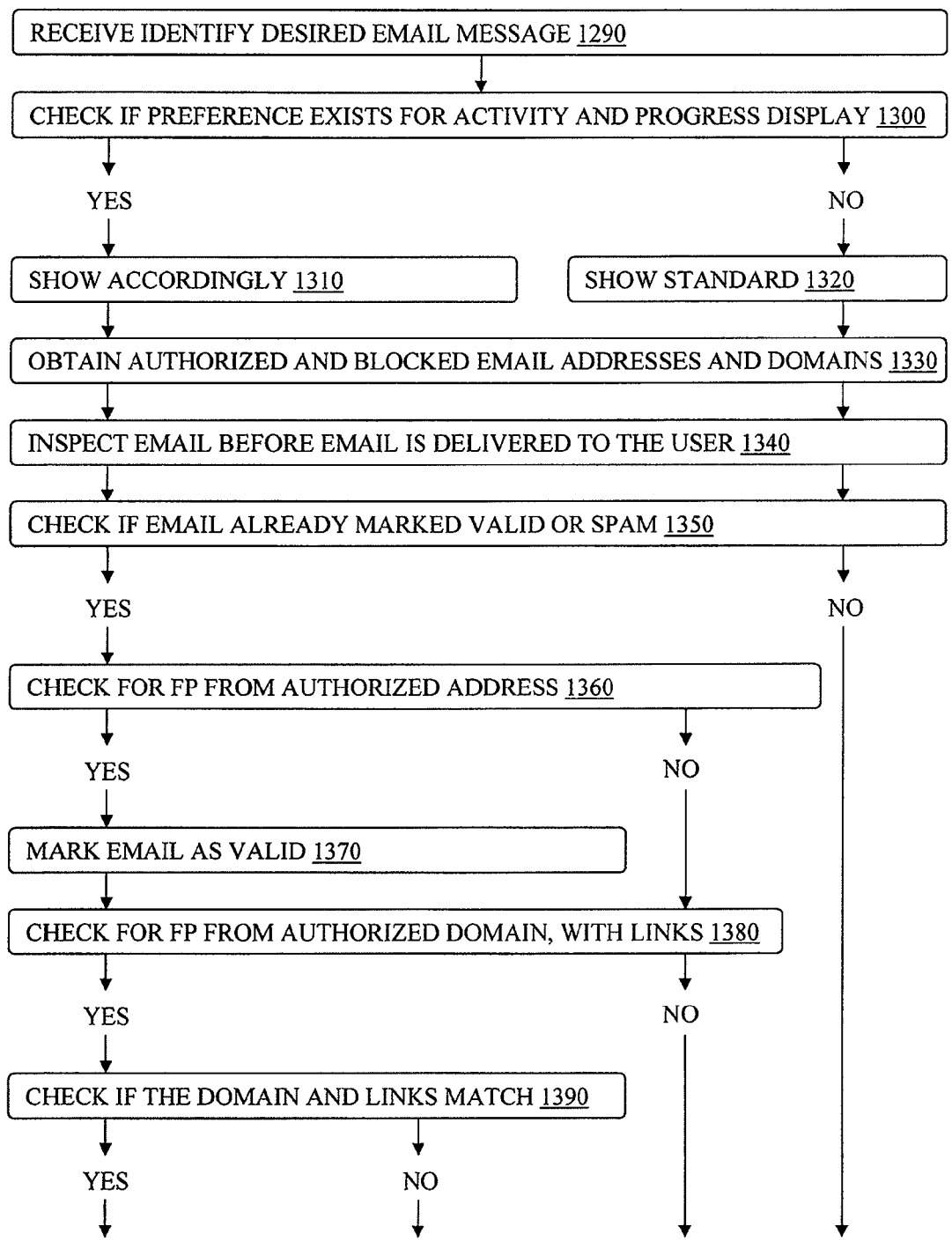
FIG. 9A - IDENTIFY DESIRED EMAIL

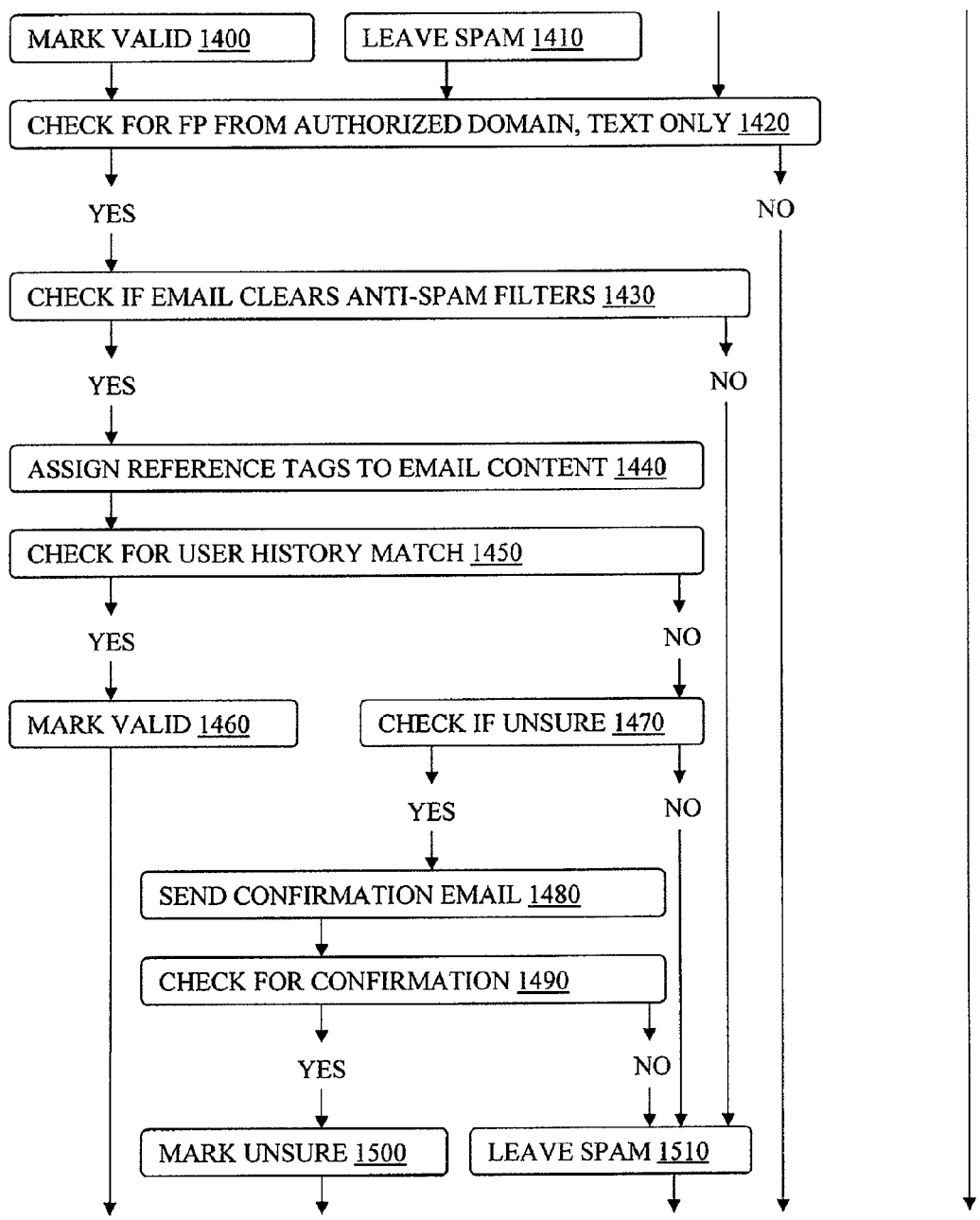
FIG. 9B - IDENTIFY DESIRED EMAIL

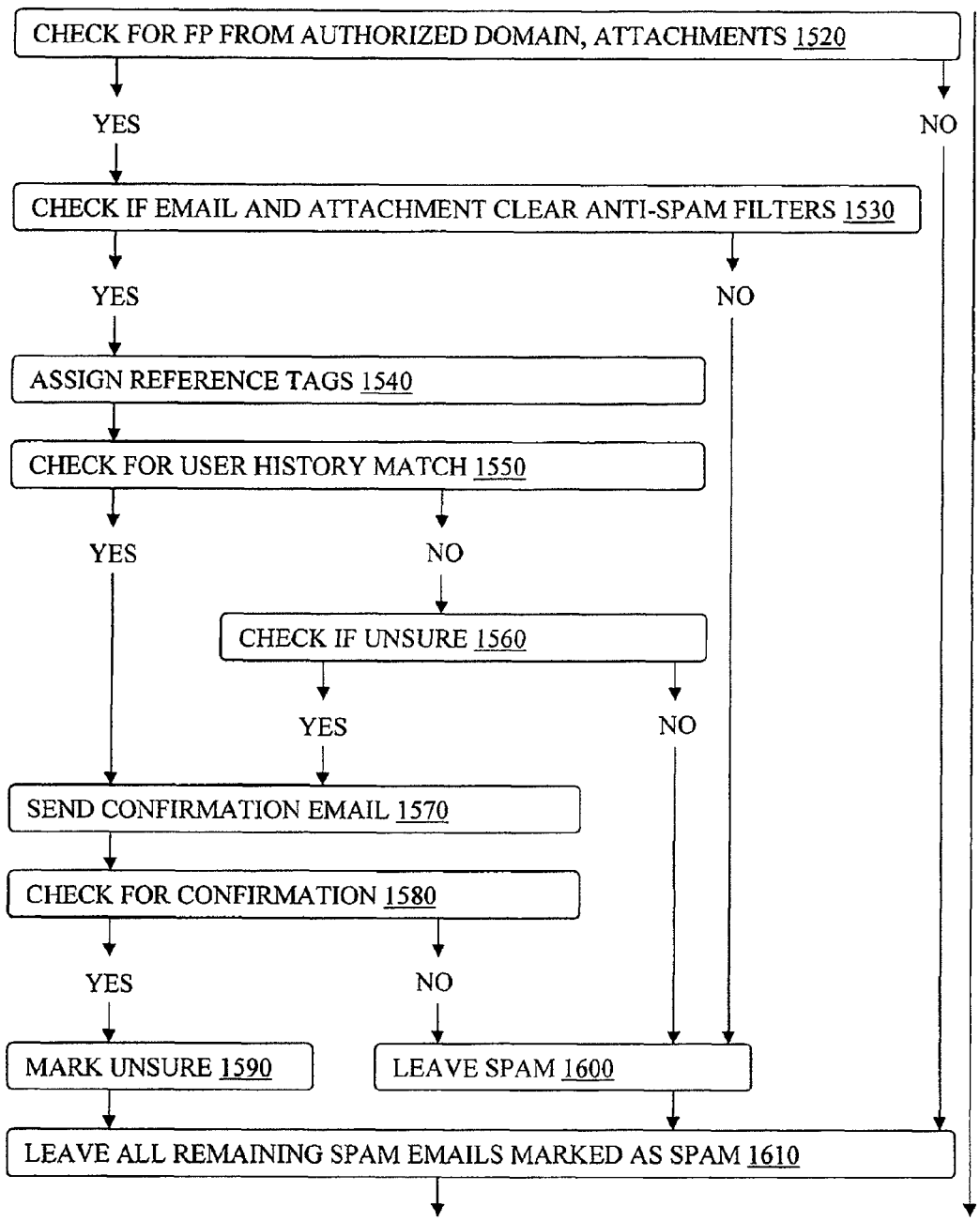
FIG. 9C - IDENTIFY DESIRED EMAIL

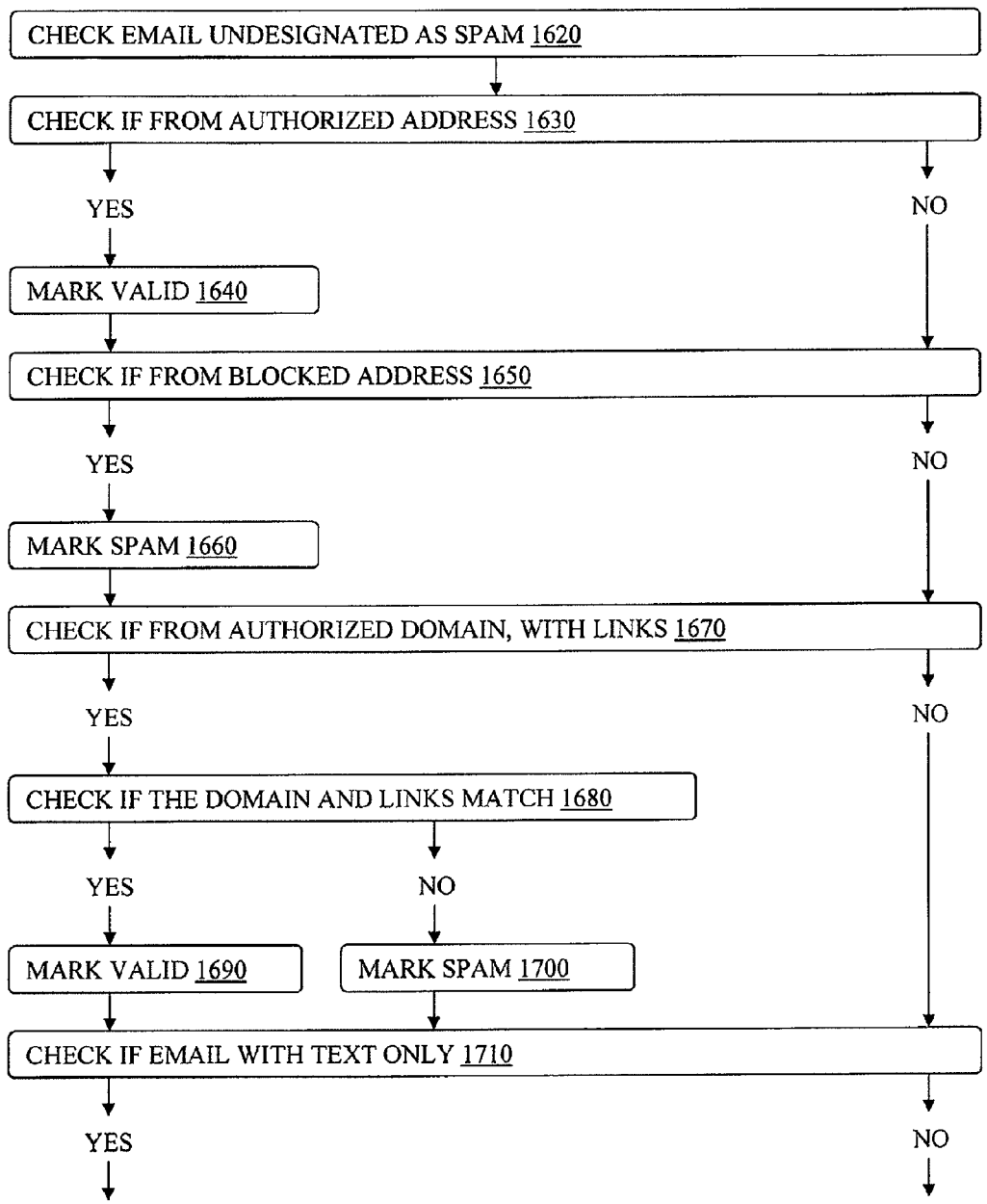
FIG. 9D - IDENTIFY DESIRED EMAIL

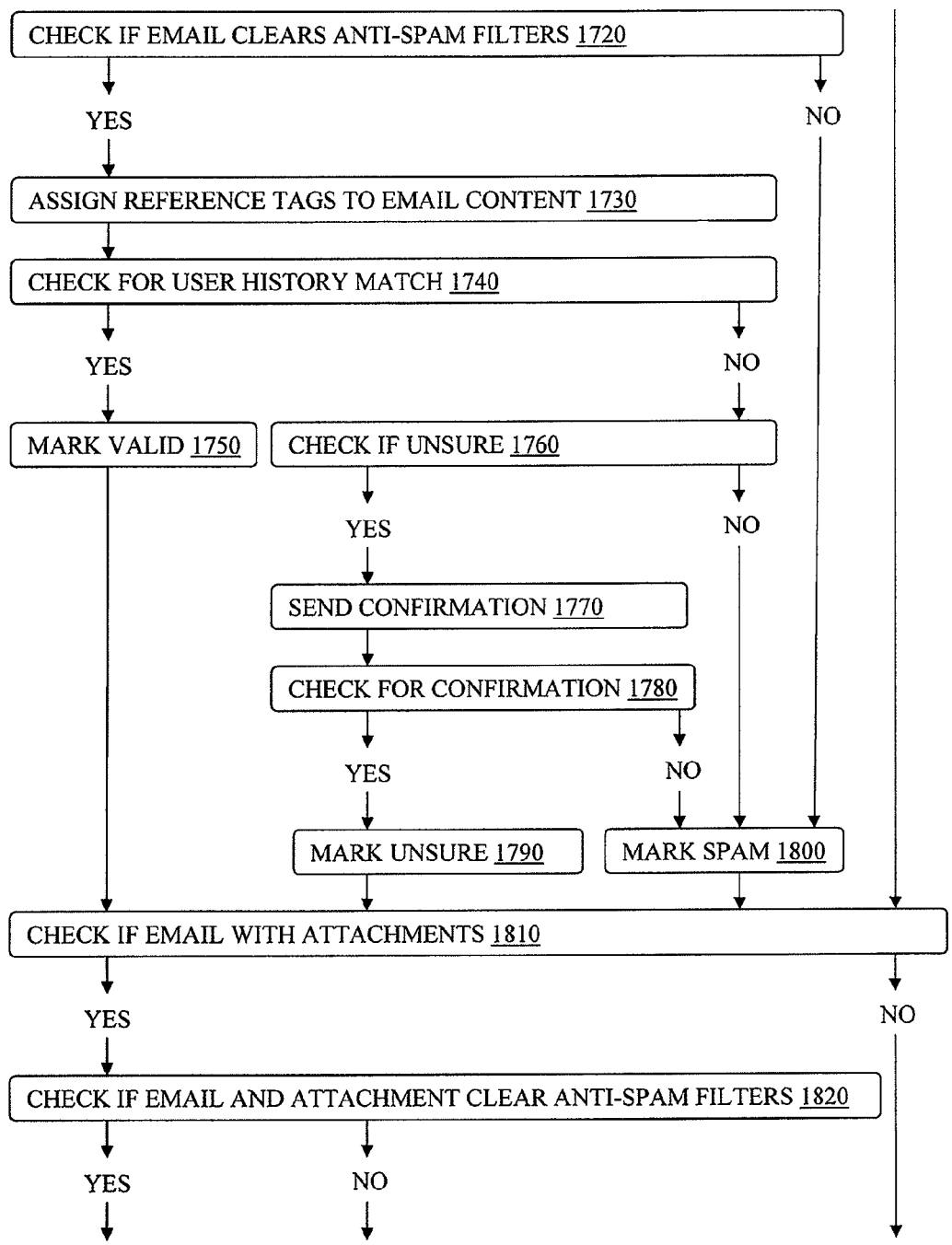
FIG. 9E - IDENTIFY DESIRED EMAIL

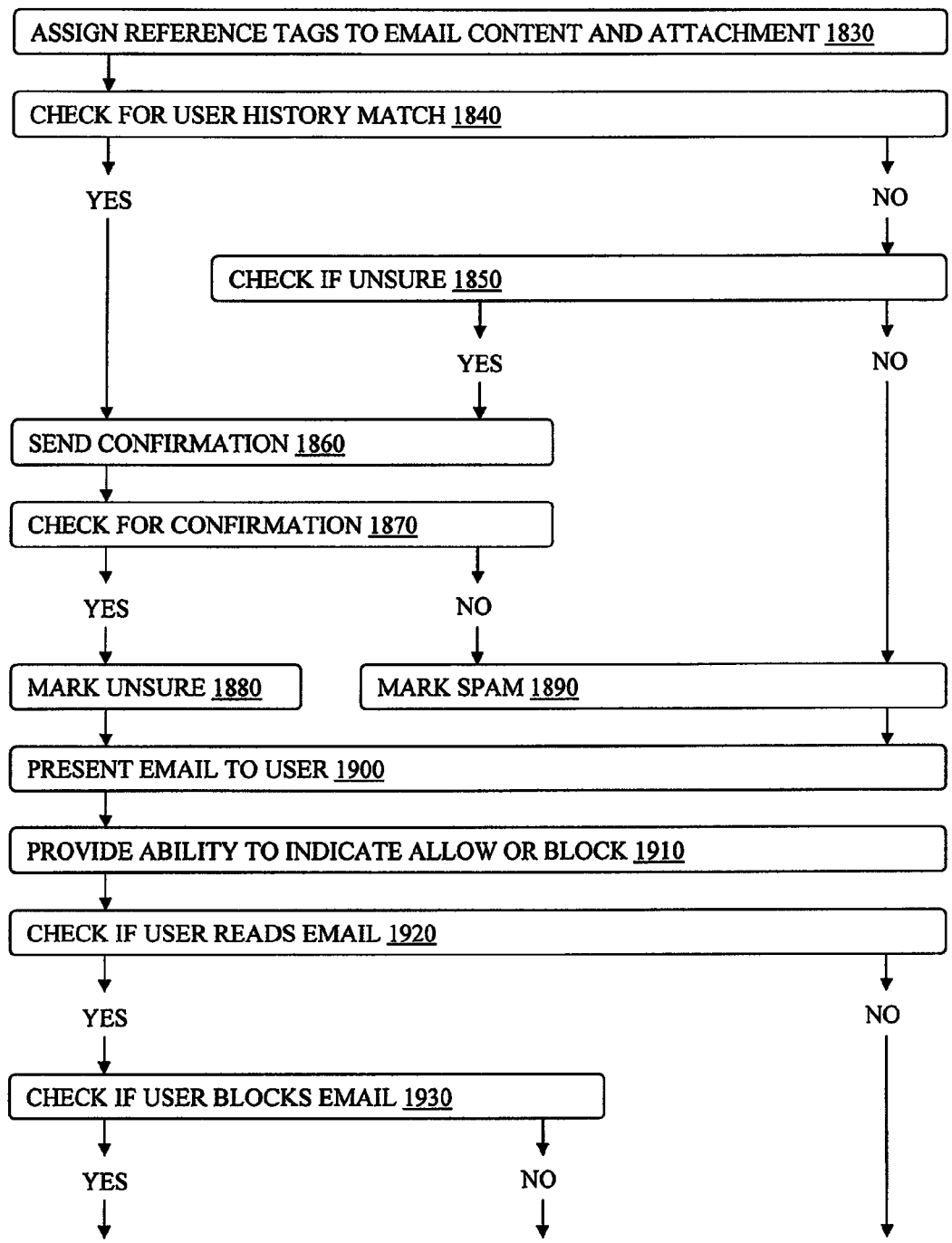
FIG. 9F - IDENTIFY DESIRED EMAIL

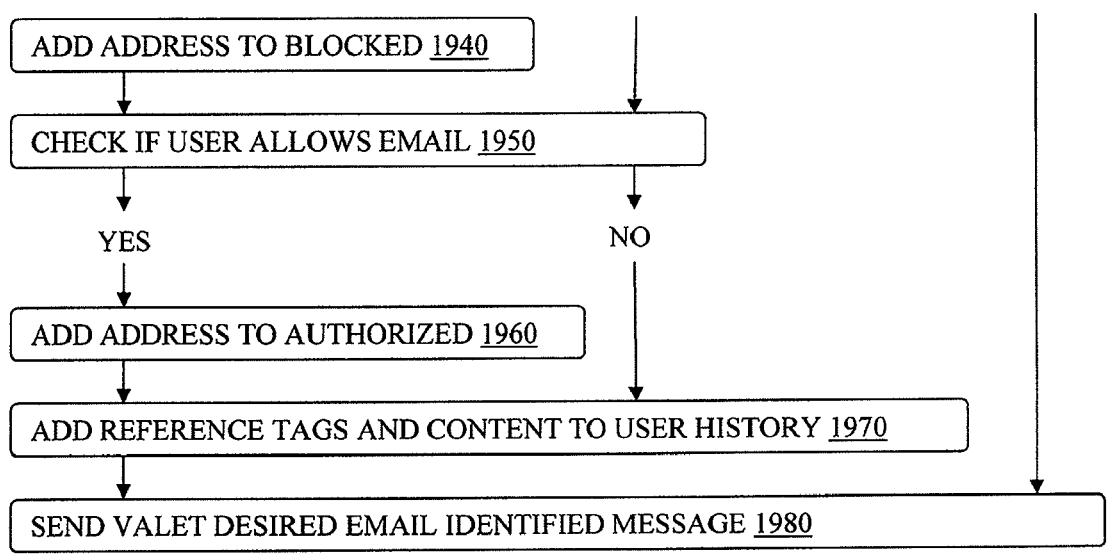
FIG. 9G - IDENTIFY DESIRED EMAIL

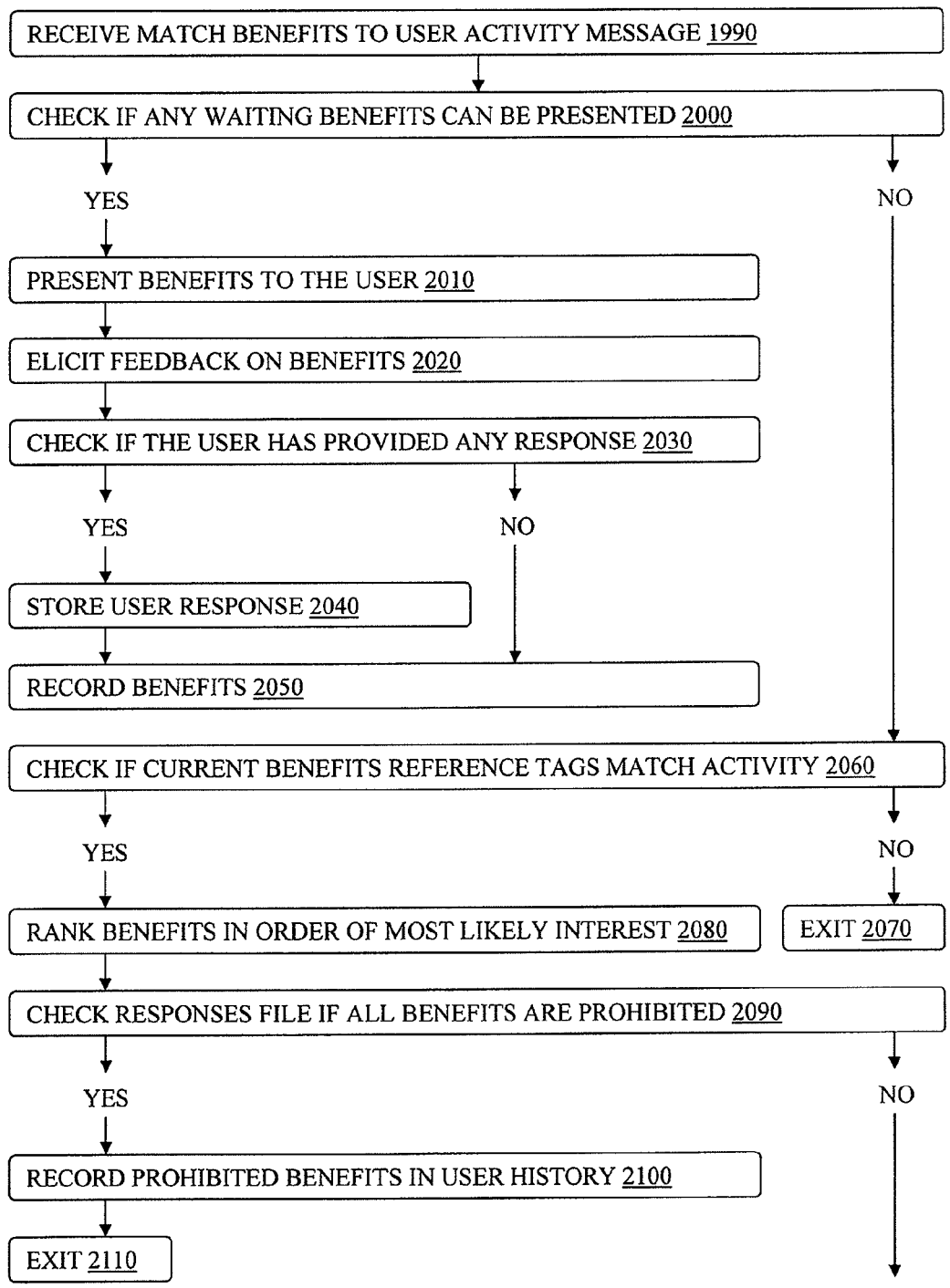
FIG. 10A - MATCH BENEFITS TO USER ACTIVITY

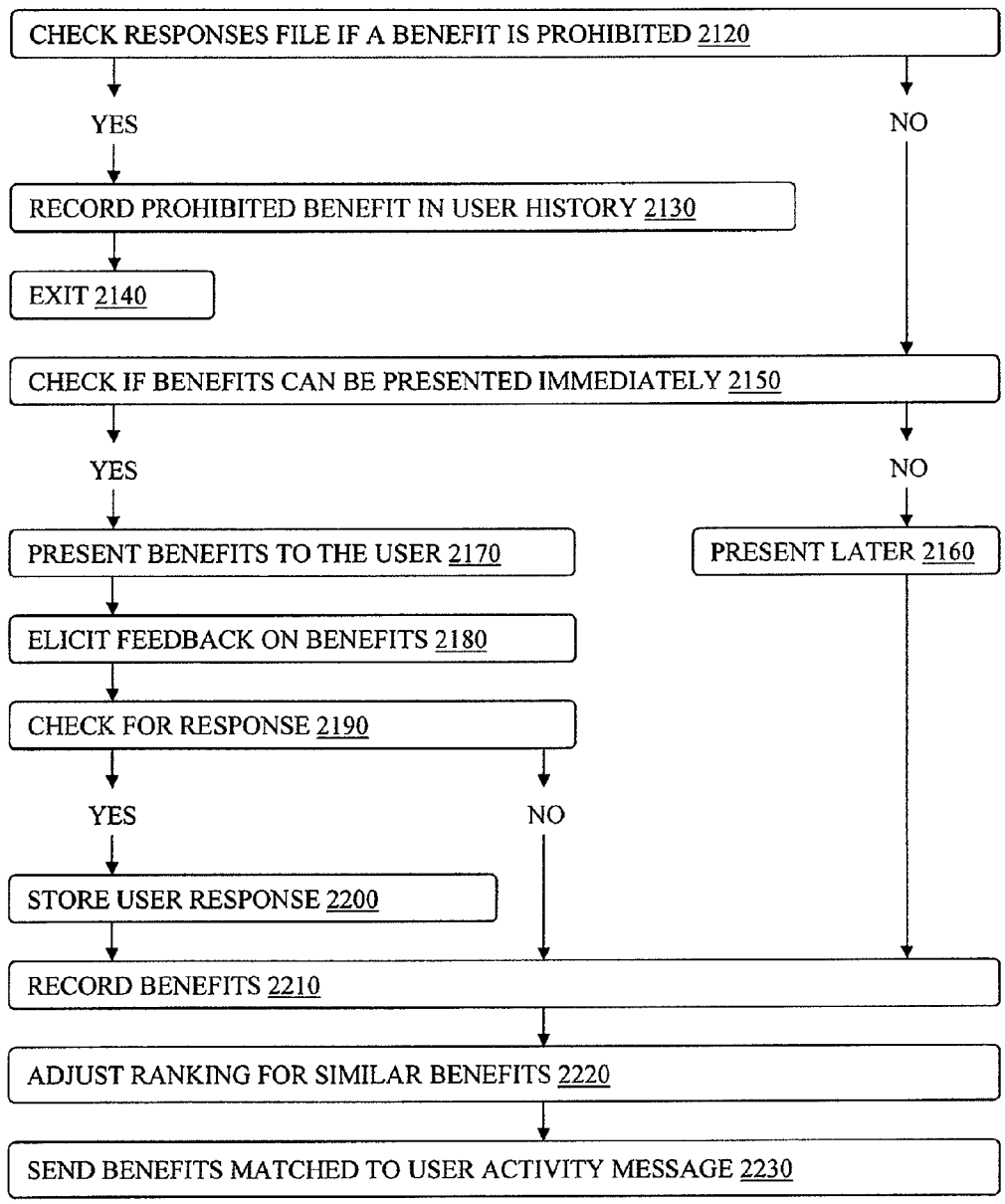

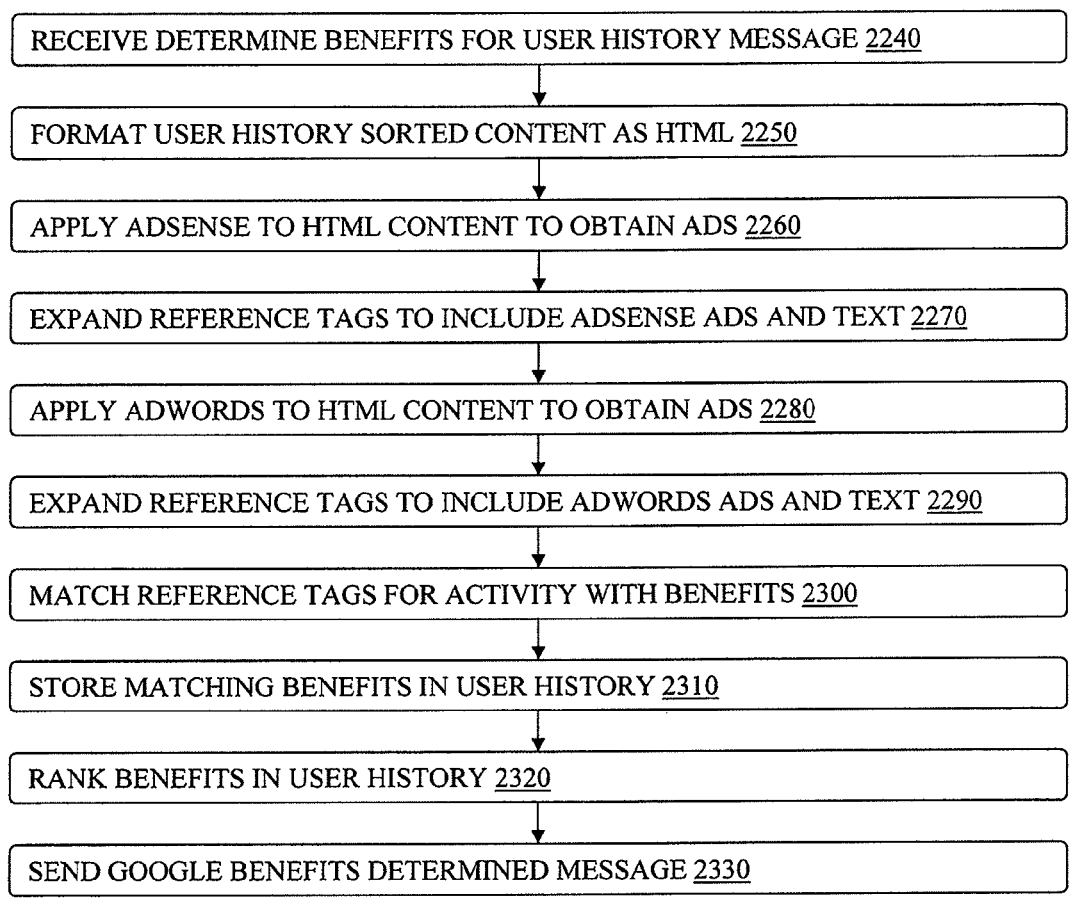
FIG. 11 - GOOGLE BENEFITS DETERMINATION FOR USER HISTORY

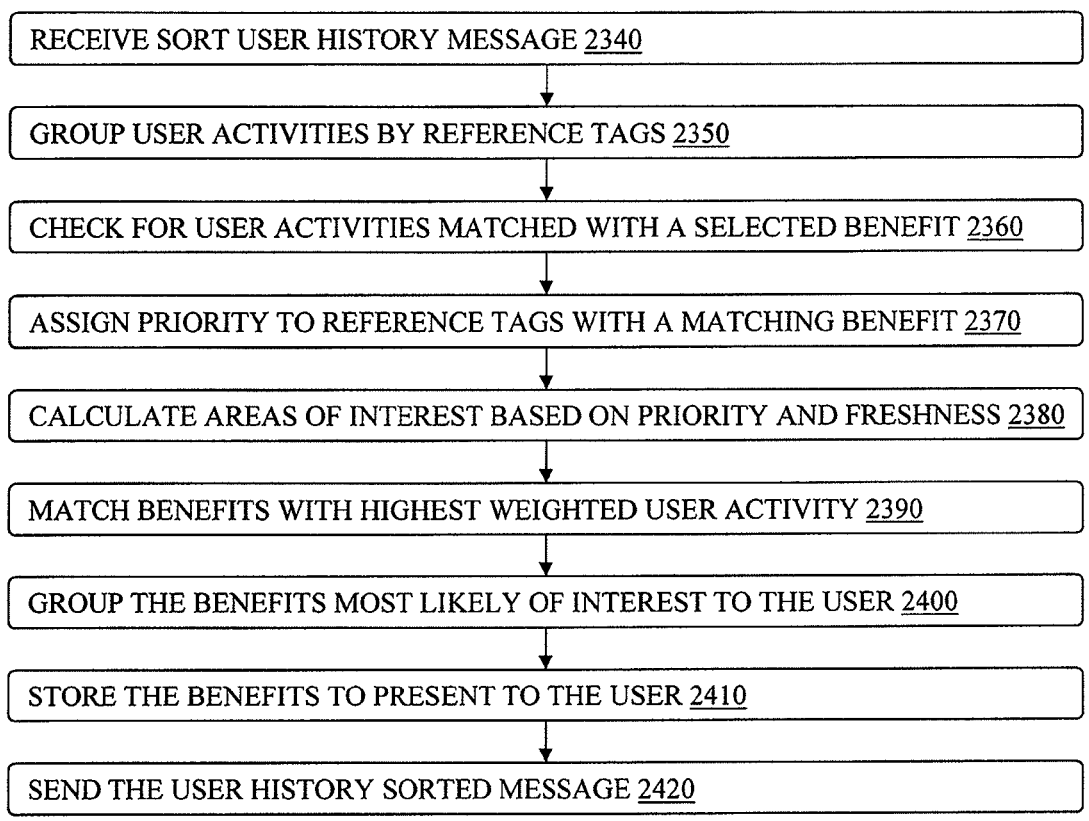
FIG. 12 - USER HISTORY SORTING

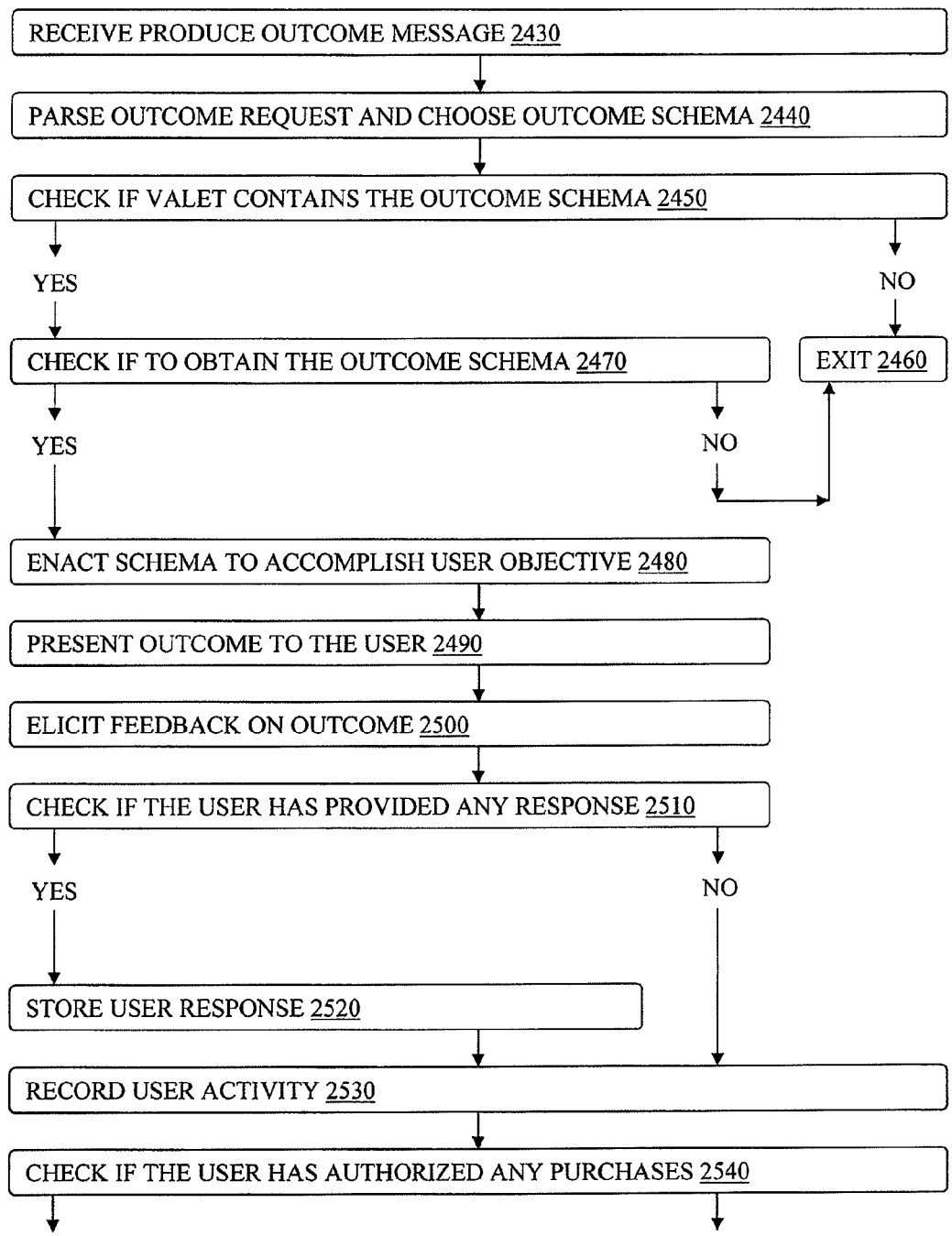
FIG. 13A - PRODUCE OUTCOME

FIG. 13B - PRODUCE OUTCOME
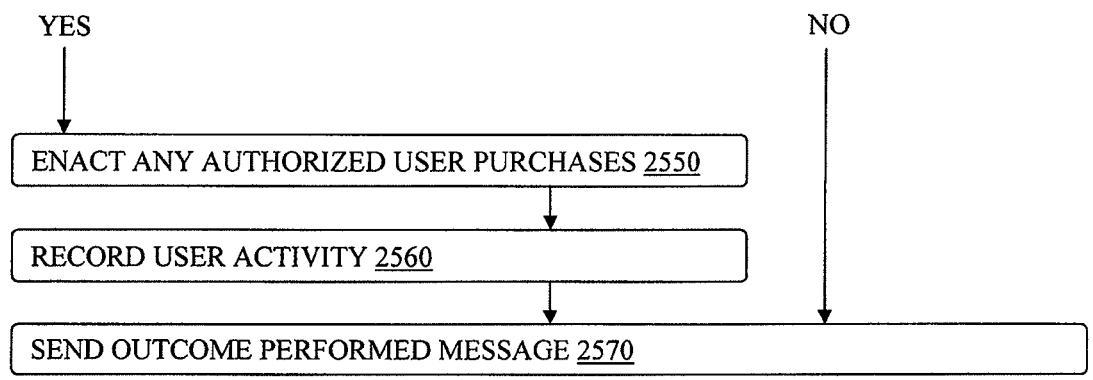

FIG. 14 - VALET COMPUTER READABLE MEDIA
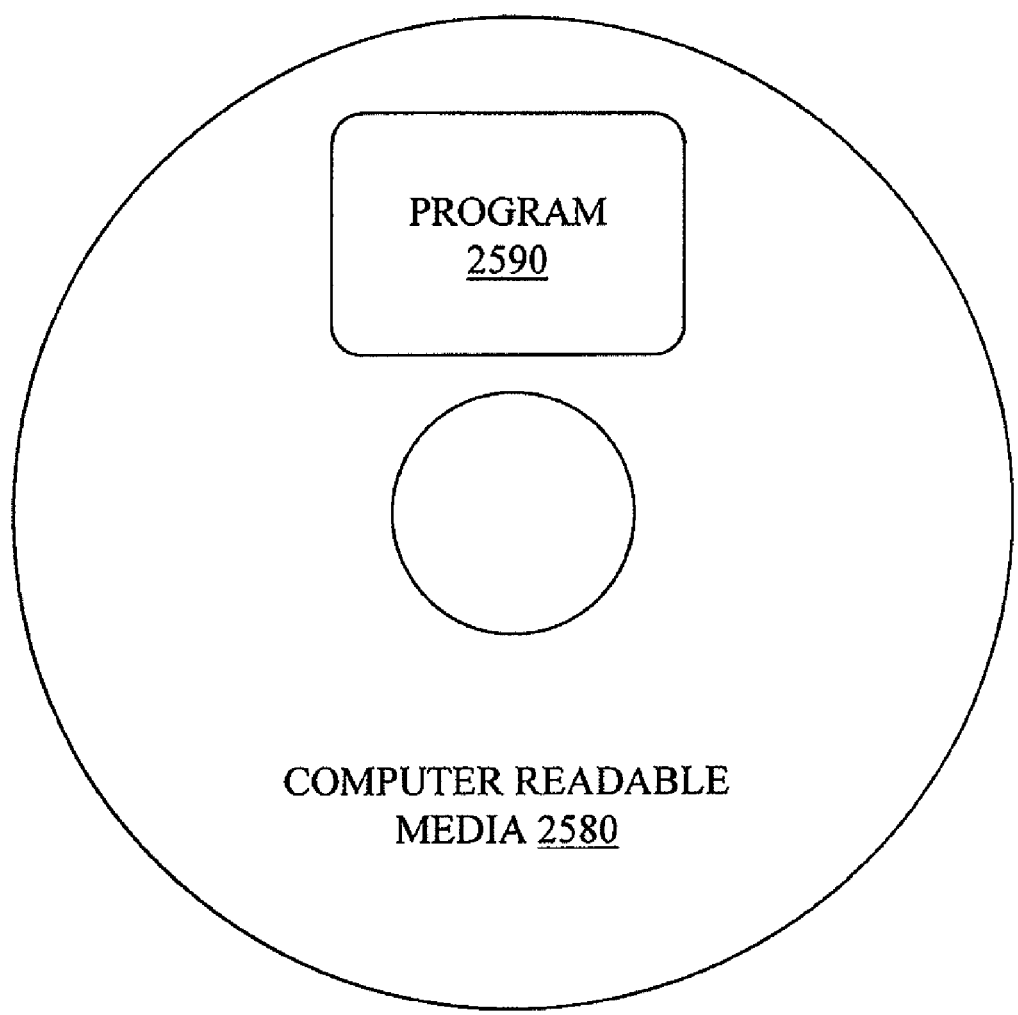

FIG. 15 - VALET COMPUTER SYSTEM, CPU, MEMORY, PROGRAM, I/O
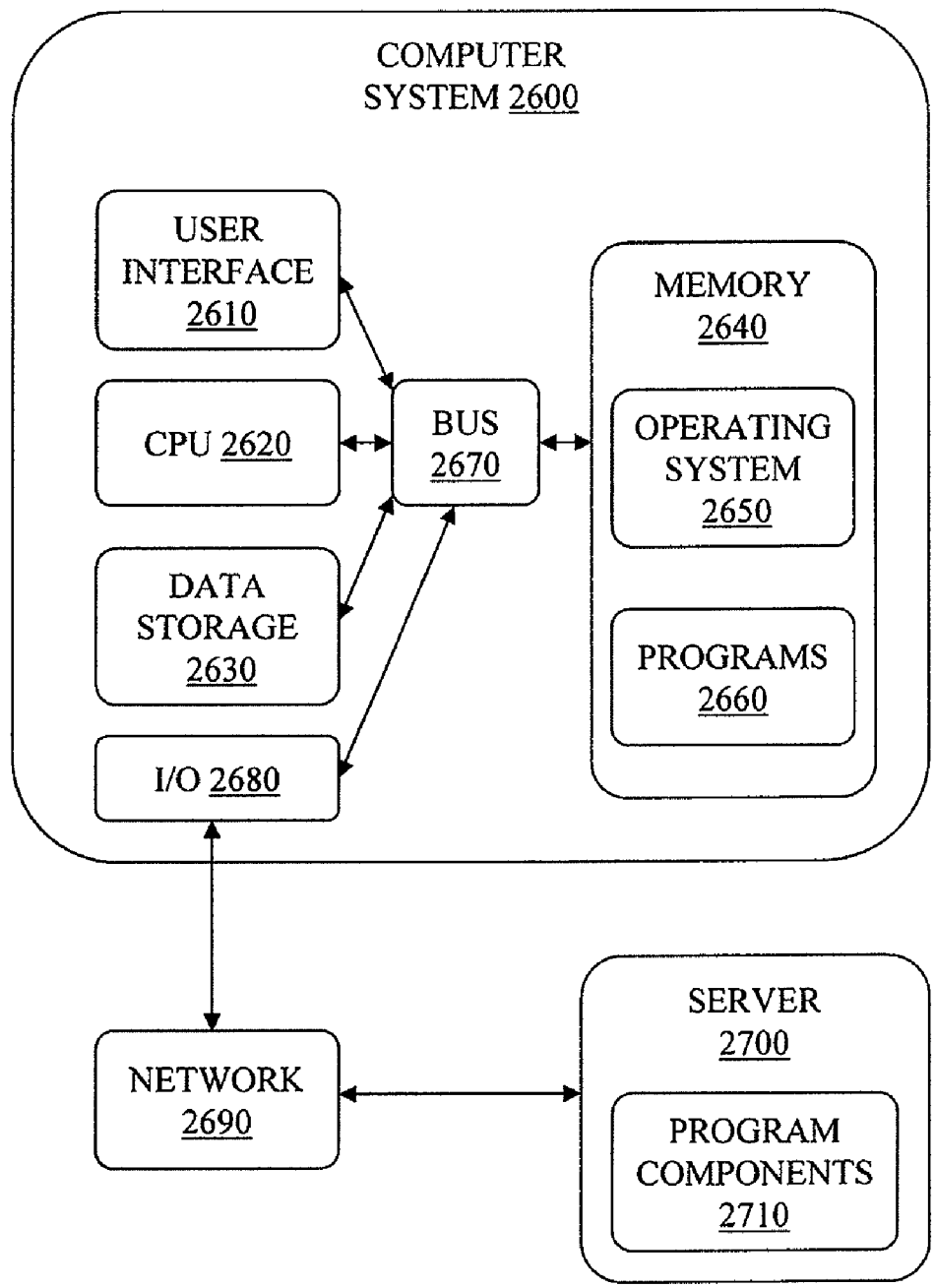

BENEFITS SERVICES PRIVACY ARCHITECTURE

CROSS REFERENCE TO RELATED APPLICATION

This application claims priority to U.S. Provisional Patent Application Ser. No. 60/999,632 filed Oct. 19, 2007, the entire specification of which is hereby incorporated by reference in its entirety for all purposes.

BACKGROUND

A closed system on a user's computer seeks to give the user the right benefit at the right time. Zero information on the user is transmitted. At any time, the user can turn the system on or off. When the system is on, it matches benefits to user activity within the context of the history of user activity. The user can view, edit or delete the encrypted and password-protected history. Benefits are presented to the user at appropriate times. User feedback is elicited. Selected benefits are enacted.

This invention relates generally to computer software, and in particular to understanding what a user does, protecting the user's privacy and matching benefits to the understanding of the user.

A user may find the computing experience frustrating or unproductive. Spam, or unsolicited email offers, clogs inboxes. Work is lost. A coupon code field remains blank for an online purchase. A user hits a figurative wall while trying to do something.

These issues of spam, lost work, obtaining a better value for purchases, receiving help on demand, and any other problem a user can experience on the user's computer, can be solved by computer software that understands the user. The software can learn all that a user does, know the user by the user's actions, and recognize when to provide benefits to the user. The software essentially becomes a skilled personal assistant for the user.

Clearly, a need for such a product exists. Productive, economic and emotional gains would accrue if a user could view only desired emails, retrieve work, realize the best possible value on all purchases, and receive needed help. Additional problems could be solved as well, such as but not limited to those encountered with editing digital pictures, communicating online, and obtaining tickets to local events of interest.

Multiple spam-blockers exist, such as Norton AntiSpam, Yahoo's email spam filters, and programs such as Axaware Spam Bully. These spam-blockers typically scan each email on an individual basis for origin and content, and attempt to filter out unsolicited offers. Spammers readily circumvent these efforts. Overzealous email spam filters cause "false positives," where wanted emails are identified as spam. Desired email is blocked. Undesired email is delivered. Axaware's Spam Bully goes beyond standard filtering and scans the user's existing inbox messages to obtain a general idea of email that belongs. However, this is similar to the proverbial missing the forest for the tree, where all user activity is the forest, and email is the tree. All user activity provides a better context to see if an email belongs.

Program features such as AutoSave in Microsoft Word attempt to address the problem of lost work. However, if a user has created a document in Word, accidentally deletes text, and then saves the document with the text deleted, the user has no way of recovering that deleted text. It is gone, and must be reproduced. Microsoft Internet Explorer's browser cache may store web pages, but if a user fills out a web form and refreshes the screen, the information entered on the form is lost, and needs to be retyped.

Providing the user with better value for an online purchase is an area of great promise and focus by many products including Google's search engine and AdWords. Based on the search keywords entered by the user on Google's home page, Google will present search results and advertising most likely to correspond to what the user wants to find. However, this advertising may be out of context. Or, the user may simply want to ascertain information, and view the advertising accompanying the search results as intrusive. Furthermore, the user has no way to determine what information has been gathered about them by Google in the process of this search, and no way to control how that information is utilized.

Much effort has been allocated towards on-demand help in products such as Microsoft Word, where a user can receive help relevant to the context the program perceives. However, certain attempts by Microsoft Word to offer help can be maddening to users, such as auto-correcting text as text is typed.

An auto-correct feature in Microsoft Word capitalizes the first letter of each sentence. If a company name such as eBay is the first word of the sentence, the first letter is in lower case on purpose. The user wants the letter in lower case, and the user types the letter in lower case, but it is changed, right before the user's eyes, to upper case. The user can try searching for help on how to turn off this feature, but the user may not know that the feature is called AutoCorrect or how to disable it, and may experience increasing levels of frustration.

Computer programs exist to face the issues of spam, lost work, best received purchase value, and on-demand computer help. However, none of these programs operate within the context of a user's entire activity history. Computer users therefore continue to suffer reduced productivity, frustrating outcomes and lost time.

BRIEF DESCRIPTION OF THE FIGURES

FIG. 1 is a computer system shown to perform the method according to one embodiment of the present invention.

FIG. 2 is a flow chart that illustrates a method for a benefits services privacy architecture according to one embodiment of the present invention.

FIGS. 3A and 3B show a flow chart that details sentience according to one embodiment of the present invention.

FIG. 4 is a flow chart that demonstrates updating Valet to keep Valet current according to one embodiment of the present invention.

FIG. 5 shows the general communication structure of the component parts of Valet according to one embodiment of the present invention.

FIGS. 6A-C detail a Valet plugin according to one embodiment of the present invention.

FIGS. 7A and 7B show a flow chart espousing the Valet dashboard according to one embodiment of the present invention.

FIGS. 8A-C show a flow chart that illustrates the user editing the user history according to one embodiment of the present invention.

FIGS. 9A-G show a flow chart that illustrates the benefit of presenting only desired emails, or eliminating spam, to the user according to one embodiment of the present invention.

FIGS. 10A and 10B show a flow chart that shows matching benefits to a user activity according to one embodiment of the present invention.

FIG. 11 is a flow chart providing an example of how benefits are matched with user activity according to one embodiment of the present invention.

FIG. 12 is a flow chart illustrating sorting the user history to group related content according to one embodiment of the present invention.

FIGS. 13A and 13B show a flow chart demonstrating an outcome according to one embodiment of the present invention.

FIG. 14 shows a computer readable media that contains the Valet program, according to one embodiment of the present invention.

FIG. 15 depicts a computer system that can be used to perform the method according to one embodiment of the present invention.

DETAILED DESCRIPTION

The above issues can be addressed by a human being skilled with computers who knows the computer user's activity history. For instance, if a computer user is an executive, a skilled executive assistant can resolve spam, retrieve lost work, obtain a better value for purchases, and give on-demand help once the assistant knows the executive.

For spam, a skilled assistant knows what the executive does, and the executive's interests. The more the assistant knows the executive, the better the assistant becomes at meeting the executive's needs. The skilled assistant is able to filter unwanted email because the assistant understands the executive. Identifying unwanted email becomes straightforward to the assistant. Valid email is either from an individual or organization the executive knows or might want to know. Everything else is discarded.

If the assistant had a camera that took snapshots of the executive's computer screen and only kept pictures when a change occurred on the screen, the work that the executive did would be recorded. If the executive ever lost work, the assistant could find the picture that corresponded to the work and recover it.

If the assistant had a collection of coupon codes for sites on which the executive made online purchases, the assistant could provide an appropriate coupon to the executive for an item to purchase. If the assistant was knowledgeable on alternative places to purchase the desired product, a good value for the product could be attained.

Furthermore, the assistant could transition from the online world into the offline world. If the executive needed to purchase something at a physical location such as a store or a restaurant, and a coupon existed for that store or restaurant, the assistant could provide the executive with that coupon or discount or deal. If the executive needed to travel, the assistant could arrange all travel details, and simply present the executive with the tickets and itinerary.

If the assistant could inspect the snapshots of the executive's computer screen and determine that the executive was stuck, the assistant could offer help. If the executive requested help, the assistant would be able to provide help instantly. The assistant could act as a skilled computer consultant. The assistant would recognize the program the executive was using, such as Microsoft Word. The assistant would see where the executive was stuck, and notice that the executive, while working in a table, kept clicking at the beginning of text in a column, and pressing the tab key. The assistant would recognize that the executive wanted to indent the first line of text in the column, which is what usually happens when the tab key is pressed at the beginning of a line of text. In table mode, though, Microsoft Word jumps to the next field in the table when the Tab key is pressed. The assistant would be able to show the executive that if a user clicks at the beginning of the line of text to indent, and pulls down the Format menu and chooses Paragraph, the user can adjust the indentation for the first line.

A similar approach can be taken with software where the software program becomes the assistant. This software program is one embodiment of the present invention. This embodiment is not meant to restrict or limit the invention. Rather, it illustrates a preferred embodiment of the invention that one skilled in the art can practice.

The software program is named Valet. Valet is available either for free or for a fraction of the cost of having a skilled human being constantly available. Valet examines every user action, determines key user activities, stores those activities in the user history, and matches those activities with benefits. The more Valet is used, the more effective it becomes at giving what the user wants, when the user wants it.

Since Valet knows the user, a consideration that immediately arises is how to protect the privacy of the user. If the user's every key activity is stored, analyzed, and matched with benefits, the user's privacy becomes paramount to protect.

Valet addresses privacy in three ways. First and foremost, the user history is encrypted and is never transmitted beyond the device on which the encrypted user history is stored. Stated differently, Valet has a zero information transmission policy. Since no data is ever transmitted out, and only the user has the password that unlocks the encryption, the user's data and privacy is protected.

Second, the user has complete access and control over the user's history. The user may view, edit, or entirely delete the user history at any time. If the user forgets the password, there is no way to recover the user history data. That data and the benefits from it would be lost to the user. The user would have to start again from scratch the process of being known. This further protects the user's privacy.

Third, the user can turn Valet on or off at any time. Valet only monitors activities and presents benefits to the user when Valet is turned on. If Valet is turned off, then the user's computer operates exactly as it did before Valet was installed. In this manner, the user has complete, total control over the user's information and privacy. Valet can only operate with the user's consent.

These three mechanisms of encryption, complete user access and control, and the ability to activate or deactivate Valet at any time combine to keep the individual's data and privacy sacrosanct and secure. These three mechanisms also distinguish Valet from computer programs such as spyware or adware or keystroke loggers that attempt to monitor a computer user's activities in order to collect information on them and transfer that information to another computer for processing. Such spyware, adware and keylogger programs are often maliciously intended, and the user does not know if the programs are on the user's computer. If the user does know that the programs are on the user's computer, the user has no way to inspect the information gathered on the user, or control it, or turn the programs on or off. A purpose of spyware, adware and keylogger programs is to violate a user's privacy. A purpose of Valet is to protect it.

With the user's privacy absolutely respected, then, how can the user receive the benefits of being known? Valet answers this by maintaining two computer files on the user's storage device. The first file is the history of the user's computer activity. The second file is a compendium of benefits that contains all deals, discounts, ads, coupons, features and functionality available to the user. Valet can check for benefits updates, similar to how the program Norton AntiVirus checks for updates through its LiveUpdate feature. With all eligible benefits present on the user's machine, Valet can match benefits with the user history, and present the right benefits to the user at the right time. All processing and matching of actions and benefits occurs only on the user's machine. The user receives the advantages of being known, all the while having the user's privacy protected.

To enable Valet to learn the user's preferences, a third file for user responses is maintained on the user's storage device. When a benefit is presented to the user, the user has the ability to specify if the presented benefit is helpful, helpful but at a later time, or intrusive. If a benefit such as a coupon has been marked as intrusive, and the coupon expires, and a new coupon is provided, then the user will likely not want that coupon. By categorizing benefits and matching existing responses to benefits, Valet improves at providing the user with what the user wants, when the user wants it.

To determine what the user wants, Valet uses a system of reference tags. Valet assigns reference tags to detected user activity. Benefits are also assigned reference tags. Valet cross-references the activity tags and benefit tags. Valet finds a match, and presents the benefit to the user. Valet prompts the user for a response to the benefit. Valet stores any response, and assigns the reference tags for the benefit to the response. The related user activity, benefits and responses now share the same reference tags.

Before the next benefit is presented, Valet checks for an existing response to a similar benefit. If the response is favorable, Valet presents the benefits. If the response is marked by the user as intrusive, no presentation occurs.

For example, if the user prints on a color printer, and is out of ink, Valet presents a coupon for more ink. If the user selects the benefit, the next time the user is out of ink, Valet offers the benefit again. However, if the user marked the benefit of offering ink as intrusive the first time, then the next time no offer for ink is extended. Some users may prefer the offer for ink, while some may not. Valet learns on a case-by-case basis, and tailors itself to the user's preferences.

Part of tailoring to the user's preferences includes integrating with how the user already operates the user's computer. A computer user can do everything on the user's computer that was done before; the user simply receives benefits presented to them at appropriate times. Instead of requiring a user to operate in a different computing environment, an uncomfortable prospect to many users, Valet integrates with the programs the computer user is most likely to already use and operate. Valet accomplishes this through a plugin architecture.

A plugin is a software module of programming code that communicates through a messaging protocol with the plugin manager, which is also a software module of programming code. The purpose of the plugin manager is to facilitate the flow and transfer of data among the user history file, the benefits file, the responses file, and all plugins which conform to the protocol implemented by the plugin manager. The plugin manager and plugins can both receive and initiate messages on a plugin manager-to-plugin and plugin-to-plugin basis.

For each program a computer user is likely to operate, a plugin can be created to integrate with the program. In fact, many computer programs such as Microsoft Office and Microsoft Internet Explorer have built into them the capability to communicate with such plugins to enable software developers to augment the capabilities of the computer programs. Software Development Kits (SDKs) are often provided by companies such as Microsoft to assist the developer in creating products that integrate with computer programs such as Microsoft Word, Microsoft Excel, Microsoft Outlook, and Microsoft Internet Explorer.

For each program Valet supports, a plugin exists for that program. This enables Valet to know when a user is about to print in Microsoft Word, or tally a budget in Microsoft Excel, or shop online. Valet can then present benefits, and enact any selected benefit.

With a plugin architecture, rather than having to rebuild Valet each time a new computer program is released, a plugin can simply be built for the program. The plugin can register with the plugin manager as eligible to receive communication for user activities. When the plugin manager detects those user activities, the plugin manager can send to the plugin the message to respond to the user activity. The plugin is responsible to execute the response.

A specific example will illustrate this process. A computer user with a Windows XP PC wants to purchase a book from amazon.com. Valet is installed on the user's computer, and the user starts the user's computer. Valet's plugin manager is registered with Windows XP as a process that is to be automatically started when the computer is started. Windows XP starts the plugin manager.

The plugin manager attempts to communicate with each plugin in the plugin folder. If a plugin answers, the plugin manager registers the plugin. The registered plugin can access the user history, benefits and responses files through the plugin manager. The plugin manager can notify the plugin of user activity. The plugin can respond.

Registered plugins can also communicate with each other. A plugin can send messages to another plugin. A plugin can receive messages from another plugin, and respond. A plugin can also send itself messages, and respond.

After all plugins have been registered, the plugin manager checks to see if Valet is on or off. The user can turn Valet on or off through accessing the system tray icon for Valet, the Valet Control Panel accessible through the Start menu, an icon shortcut placed on the desktop or any other location by the user, or the Valet toolbar accessible through the Windows taskbar.

If Valet is off, nothing happens.

If Valet is on, Valet monitors user activity and waits for a key activity, also referred to as a trigger activity. A key activity is any activity for which the plugin manager is programmed to respond. It should be noted here that the plugin manager can utilize a plugin or a series of plugins to ascertain what constitutes an appropriate key activity for which to respond. This enables the plugin manager to become increasingly more sophisticated and relevant in "listening" for key activities.

A key activity is further defined as any activity where at least one plugin is registered to respond to that activity. The plugin is then responsible for the response to the activity. A response may include, but is not limited to, matching the user's actions with a relevant benefit.

The user opens Internet Explorer, thereby adding iexplore.exe to the list of system processes. The plugin manager, monitoring the list of processes, inspects the name of the new process iexplore.exe, and checks for any plugins registered to respond to iexplore.exe. For each plugin registered to respond to iexplore.exe, the plugin manager sends to the plugin the startup message. The plugin receives the startup message, and executes the programming code the plugin contains to respond to the message. Though the code is most likely to be stored as software, the code could also be integrated directly into hardware circuitry.

The plugin manager also checks for any plugins that are already integrated into iexplore.exe. Many programs such as Microsoft's Internet Explorer already have built into them the ability to communicate with plugins. Internet Explorer refers to these modules of software programming code which conform to an established standard of communication as an "add-on" instead of a "plugin."

Add-ons may interact with Internet Explorer in any manner possible, provided they conform to the specifications expected by Internet Explorer for an add-on. In this context, the Valet plugin is an add-on for Internet Explorer that can also communicate with the Valet plugin manager. The Internet Explorer add-on, as a Valet plugin, can only operate with the user's consent. The user has the option to deactivate the add-on at any time through the system tray icon for Valet, the Valet Control Panel accessible through the Start menu, an icon shortcut placed on the desktop or any other location by the user, the Valet toolbar accessible through the Windows taskbar and the add-on taskbar in the browser. The add-on can only function when active. This enables the user to control when the add-on can know activity.

After the user opens Internet Explorer, the user navigates to amazon.com. The Internet Explorer add-on sends a message to Valet to add the action of navigating to amazon.com to the user history. The user places an item in the user's shopping cart on amazon.com, and goes to checkout. The Internet Explorer add-on sends a message to Valet that the user has selected an item along with the item the user has selected. The Internet Explorer add-on also scans the web page for the presence of a coupon field, and finds the field in the form section of the html underlying code for the page. The Internet Explorer add-on sends a message to Valet to see if a benefit exists for a coupon for amazon.com.

Valet queries the benefits file, and finds a current coupon for amazon.com. Valet sends the Internet Explorer add-on the message to prompt the user that a coupon exists for the purchase, and asks the user if the user would like to apply the coupon. The Internet Explorer add-on sends the user response to Valet to store in the responses file. If the user accepts the coupon, the coupon is applied towards the purchase, and the Internet Explorer add-on sends Valet the message to store in the user history that the user accepted a coupon for amazon.com.

The Valet provider may have an affiliate relationship with amazon.com. As an affiliate, the Valet provider receives part of the purchase from Amazon.com, typically between one and three percent. In this manner, the user, amazon.com and Valet provider gain. Greater savings benefits the user. Amazon.com benefits from a happier customer. Because the Valet provider receives part of the purchase, Valet can be available for free. This benefits the user and facilitates user base expansion because it eliminates the product purchase barrier. The greater the user base, the more the discounts that can be obtained from benefit providers. The greater the discounts, the more the user base can benefit and expand. This cycle can reinforce itself to provide increasingly powerful benefits to the user, provider and affiliate.

The entire time that the user is working in Internet Explorer, the Internet Explorer add-on is also monitoring to see if the user has made any changes to the website, i.e. the content of the webpage has changed. If the content has changed after five seconds, or another interval of time that can be adjusted by the user or set programmatically, the Internet Explorer add-on saves a copy of the webpage, encrypts the webpage, and sends a message to Valet to store in the user history the name and location of the copy of the webpage.

This solves the problem of lost work for the user. For instance, the user may write a review on amazon.com of a product. Halfway through writing the review, the user's attention shifts elsewhere, and the user closes the browser. This deletes whatever the user wrote.

At a later time, the user returns to write the review. Rather than reconstruct the review, the user double-clicks the Valet system tray icon to open the Valet dashboard. The user clicks Saved Work. The user clicks amazon.com to view the saved work for amazon.com. The user scrolls through the list of saved pages. The user clicks the desired page.

To address the issue of too many saved pages consuming vast quantities of user memory, Valet takes a key frame approach. In video compression, key frames are identified that serve as a starting point for subsequent frames. Rather than store each entire frame, the compression engine stores only the changes. This vastly reduces required storage and expedites video playback. Valet adapts this concept to saving work. A key work is identified, such as when a user first loads a page. If the user fills in information in a field, only the information that the user entered is saved, along with the location and form field on the page. When the user views saved pages, Valet reconstructs the saved work from the key work, just as a media player reconstructs a video frame.

As time transpires, Valet stores less and less detail. For instance, after one month, only the last saved instance of a body of work is saved. Instead of storing each step in filling out a form, the entire completed form is stored. Valet encrypts and password-protects this information, and transmits none of it.

In addition to recovering work for a user, Valet can help do the work. Since saved information may include user names, passwords, and addresses, Valet can populate commonly used fields on a form, similar to Siber Systems' RoboForm. The user can specify on a domain name basis what forms and fields Valet should complete. Valet stores user preferences in the responses file, and records form auto-completion in the user history.

Valet opens the page in Internet Explorer and the user picks up where the user left off. The user finishes the review, and clicks Submit. The review posts to amazon.com. The Internet Explorer add-on records in the user history that the user submitted a form, stores a copy of the form, and adds amazon.com to the list of allowed email domain names.

After writing the review, the user opens Yahoo Mail to check email. Valet recognizes that Yahoo Mail is about to open. Before opening Yahoo mail, Valet looks for any plugins registered to respond to the "open Yahoo Mail from a browser" message.

Valet finds a plugin registered to respond to the "open Yahoo Mail from a browser" message. Valet sends the Yahoo Mail plugin the message. The Yahoo Mail plugin responds. The Yahoo Mail plugin obtains unread email through the Yahoo Mail application programming interface (API). Spam identification commences.

The responses file is checked to see if the user wants an update on activity and progress, and the level of detail. A detailed update is specified. The Yahoo Mail plugin informs the user of what it does as it does it. The user can hide the details or the update. Indicated user preference is stored in the responses file.

A message is sent to the plugin manager to obtain from the user history the lists of authorized email addresses and domain names, and blocked email addresses and domain names.

Before the Yahoo Mail plugin can access an email, Yahoo Mail applies its own spam filters. The Yahoo Mail plugin looks for a "false positive" where an email marked as spam is valid. A "false positive" can have an authorized email address, authorized email domain name with at least one hyperlink, authorized email domain with text only, contain at least one attachment, or include any other kind of email.

The Yahoo Mail plugin looks for a "false positive" from an authorized email address. If so, the IsSpam property for the email is changed from 1 to 0 to mark the email as valid.

The Yahoo Mail plugin looks for a "false positive" from an authorized email domain that contains at least one hyperlink. If the authorized domain name and each hyperlink domain name match, the email is valid. If the domain names differ, the email is spam. For instance, an email from amazon.com including hyperlinks to amazon.com is valid. An email appearing to originate from amazon.com that contains a link to another site is spam.

This illustrates the importance of the user history. Yahoo Mail does not have access to the entire user history, and has no way of knowing that the user has gone to amazon.com and expects email from amazon.com. All Yahoo Mail knows is that an automated mailing program sent an email that is likely spam. Valet's Yahoo Mail plugin, however, can access the user history, and allow valid email from amazon.com.

The Yahoo Mail plugin looks for a "false positive" from an authorized email domain that contains only text. The email is put through standard anti-spam filters such as, but not limited to, keyword/phrase filtering, IP address, character set, and origin from known spam servers updated in real time on Internet blackhole lists. If the email runs afoul of any of these filters, the email is spam. If the email clears the filters, the text is analyzed and assigned reference tags to categorize the content. These reference tags are compared with reference tags in the user history. If a match exists, the email is valid.

If the Yahoo Mail plugin is unsure about a match, a confirmation email is sent. The sender is asked to reply and identify a provided password. If no response occurs, Valet leaves the email marked as spam. If the sender responds with the correct password, the plugin presents the email to the user as an unsure email. The user is prompted to authorize or ignore the sender. If the user authorizes the sender, the email address is added to the authorized email addresses in the user history. If the user ignores the sender, the email address is added to the blocked email addresses in the user history.

The Yahoo Mail plugin looks for a "false positive" where an email contains at least one attachment. The email and each attachment are put through standard anti-spam filters. If the email and each attachment clear the filters, reference tags are assigned to the content and attachment. These reference tags are compared with reference tags in the user history. To guard against an unsavory attachment, a confirmation email is sent if a match exists or is in question. If the sender responds with the correct password, the email is presented to the user as an unsure email. If no match exists or no response occurs, the email is spam.

All remaining emails marked as spam by Yahoo Mail stay as spam.

After inspecting for a "false positive," the Yahoo Mail plugin looks for an email marked as valid by Yahoo Mail that is spam. An email from an authorized email address remains valid. An email from an authorized domain names containing hyperlinks that match the domain name is valid. An email from an authorized domain names containing hyperlinks that differ from the domain name is spam. An email from a blocked email address or blocked domain name is set as spam. For each remaining email, including an email with at least one attachment, the Yahoo Mail plugin applies standard anti-spam filters. An email that passes this stage is analyzed for content and matched with the user history. If a match exists, the email is allowed. If the Yahoo Mail plugin is unsure, a password verification email is sent.

The Yahoo Mail plugin sends Valet the "valid Yahoo email from a browser identified" message. Valet proceeds to open Yahoo email. The user receives only valid emails.

The user can allow or block an email within the email body, subject or row listing. This saves the user having to indicate valid or spam outside of the email. If the user specifies valid or spam, the Yahoo Mail plugin updates the responses file and the user history, including the lists of valid or blocked email addresses and domain names. For each valid email that the user reads, the email reference tags and content may be stored in the user history.

If the user had another email provider such as Microsoft Windows Live Hotmail or Google Gmail or America Online, or any other web-based email provider such as a school account, or an anti-spam program such as Norton AntiSpam or Axaware Spam Bully, or an email client program such as Outlook or Outlook Express, a plugin for the email could present only valid email to the user in a similar manner to the plugin for Yahoo Mail. The plugin would integrate with the user's existing way to access email, reference unread email and any attachments against lists of authorized and blocked email addresses and domains, match remaining email and any attachment content with the user history, and send a confirmation email if unsure. The user could allow or block an email within the email body, subject or row listing.

After the user checks email, the user opens Microsoft Word to create a document. Valet recognizes that Microsoft Word has been opened. Valet checks for any plugins registered to respond to Microsoft Word. Similar to Internet Explorer add-ons, Microsoft provides tools to integrate a plugin with Microsoft Word. Valet checks for any plugins already configured to integrate with Microsoft Word. Valet finds an integrated plugin, and waits to receive messages from the plugin.

The user can activate or deactivate the Word plugin at any time. As the user operates Word, the Word plugin monitors commands if the Word plugin is active. After Word responds to a command, the Word plugin checks for its own response to the command. The user gives Word the Select All command. Word highlights the text. The Word plugin finds a response for the Select All command, and executes it. Highlighted text is stored to prepare for recovering the text. The next typed character may inadvertently replace the highlighted text.

A typed character replaces the highlighted text. The Word plugin readies to recover text. The user responses file is checked to determine if a response to a "confirm highlighted text replacement" prompt or a cross-referenced response exists. A previous response marked as intrusive is found. Rather than prompt the user, the content is stored in the user history to enable work recovery. Because the user responses file is cross-referenced, the user's communication preference is followed.

The user continues to create the document in Word. The user pulls down the Table menu, and chooses Insert-Table. Two columns and one row are specified. The user clicks within the first row, and presses the Tab key to indent. Instead, the insertion point jumps to the next column. The user clicks again within the first row, and presses the Tab key. The user tries once more.

The Word plugin senses that the same repeated series of commands has been given while the document remains the same. No previous response in the responses file exists for an "indent text in a column" prompt. The Word plugin informs the user that to indent the first line of text in a column, the user can pull down the Format menu, choose Paragraph, and set the first line indent. A video of recorded screen action illustrates the steps. The plugin asks the user if the communication was helpful or intrusive.

The user finishes the interaction by marking the communication as helpful, and successfully indents the first line in the column. The Word plugin records in the responses file that the "indent text in a column" was received. The user history is updated that help was received working in Word tables. A message is sent to Valet to assign reference tags to the user activity. Valet assigns reference tags such as, "<platform>PC</platform> <os>Windows XP</os> <app>Microsoft Word</app> <version>2003</version> <activity>help for tables</activity>." These reference tags are formatted similar to html tags and include the platform, operating system, application, version and activity. They can correspond to advertising in a manner similar to how Google AdWords associates keywords with advertising. The reference tags serve as the keywords. Valet sends the "reference tags assigned" message. A message is sent to Valet to search for at least one matching benefit. Valet finds three matches, and sends a "benefits found" message. The Word plugin waits for an opportune time to present the benefits.

The user gives Word the Save command. The plugin assigns reference tags to the content of the document and stores the tags in the user history. The plugin compares the content of the document to the last version of the document content in the user history, and may record any changes. Word saves the document.

A document save is a pause in user activity, and a potential opportune time to present benefits. Waiting benefits are presented to the user. For each benefit, the user has several options, such as the ability to select it, classify it as intrusive, or classify it as useful at a later time.

Benefits are presented in as acceptable and non-intrusive a manner as possible. One way is similar to how Google incorporates video ads with YouTube video content. A mostly transparent overlay appears in a designated area of a video for a limited time. The user can close the overlay, or click to select it. The Word plugin can adapt this approach to designate a screen area, ideally out of the way of the document, and present the benefit to the user. The benefit could be shown as an animated gif, Adobe Flash or Microsoft Silverlight video, or any way of displaying kinetic or static content. Another way to present a benefit is as an interactive display area similar to a Google Gadget Ad that can contain links, audio, video, games, news updates, images and other functionality to engage the user and relate information about the benefit.

The user clicks a benefit. The Word plugin records in the user history that a benefit was selected. The Word plugin sends Valet a message to present the benefit to the user. Valet presents the benefit and notifies the benefit provider.

The user gives Word the Exit command. The Word plugin cleans any allocated memory and shuts down. Word exits.

In a manner similar to Word, a Valet plugin can be built for any application or program a user may operate, such as, but not limited to, Microsoft Excel or Adobe PhotoShop. The plugin registers with the Valet plugin manager. When the application starts, the plugin for the application starts. The user can turn the plugin on or off at any time. If on, the plugin can monitor and respond to user commands, and communicate with the user history, benefits and responses files through the Valet plugin manager. If a response to a user command includes presenting benefits, the plugin can present benefits to the user and enact a selected benefit. When the user is done with the application and any benefit selection, the plugin cleans any allocated memory and shuts down.

A Valet plugin can also function as its own application. A Valet application plugin can create windows, dialog boxes, menus, frames, links and toolbars and interact with a user, just as a program like Microsoft Word can. A Valet digital pictures application plugin can provide a workspace for a user to import, organize, edit, and print the user's digital photography, among other capabilities. A Valet central information repository (CIR) application plugin can contain all information such as passwords and usernames and contacts and calendar appointments and addresses and any other information stored in the user history that may be convenient for the user to access in one place. A Valet online communication application plugin could cull together in one window all forms of the user's online communication referenced in the user history, including multiple email accounts, instant messaging programs and voice-over-ip programs; a user could conveniently reach any contact. These examples are not meant to limit the invention, but rather to illustrate ways in which one skilled in the art can customize the invention by producing a plugin for desired functionality.

A plugin can also integrate with an existing Valet application plugin, where the Valet application plugin serves as the host for a plugin, similar to how Microsoft Word serves as a host for a plugin. For the Valet digital pictures application plugin, a plugin can produce a book of selected digital pictures. For the Valet CIR application plugin, a plugin for a group calendar can schedule appointments among multiple contacts. For the Valet online communication application plugin, a plugin for a call center can route communication among contacts. Many other plugins can be built to provide functionality to the user.

Each Valet plugin can be accessed through the system tray icon for Valet, the Valet Control Panel accessible through the Start menu, an icon shortcut placed on the desktop or any other location by the user, or the Valet toolbar accessible through the Windows taskbar. Also, each Valet plugin can monitor and respond to user commands, communicate with the user history, benefits and responses files, present benefits to the user and enact a selected benefit.

To gain proficiency in presenting useful benefits, at periodic intervals, normally during times of pause between user activity, Valet sorts the user history to group related content. Sorted content can be formatted in several ways such as html and xml, and matched with advertising. Valet's plugin architecture can employ various algorithms to match content with advertising, such as Google's AdSense. This applies the Google content-ad matching algorithms within the entire context of a user history to increase the probability of obtaining relevant benefits such as ads. A user can choose from existing benefits-matching plugins, or obtain additional ones for sale or for free.

When Valet presents an ad as a benefit to the user, the user can select the ad. Valet then enacts the benefit. If the ad is for a website, Valet opens a browser and indicates to the advertiser that the advertisement was selected and originated from Valet. Valet can receive payment for this from the advertiser. Once the user is on the advertiser's webpage, the user is out of the Valet system. Any information collected on the user at that point is governed by the privacy policies of the advertiser. To the user, it is as if the user had gone to the advertiser's site on the user's own. In this manner, Valet can be compensated for providing benefits, and protect the user's privacy within the confines of the Valet system.

Valet also accounts for freshness, where freshness denotes the most recent user activities receiving a greater emphasis when scanning for content. One approach among many for accounting for freshness is assigning a weighted average, and using the weighted average as a multiplier to rank priority. For instance, if ten archived copies of work exist, the most recent activity receives a 10, the next most recent 9, and so on until the farthest back work receives a 1. When determining what ads or benefits to show, the weight serves as a multiplier.

If one archived user activity regards horse racing, and two further back regard lawn mowing, then horse racing receives a score of 10*1=10. Lawn mowing receives a score of 2*1+ 3*1=5. The user is offered a benefit relating to horse racing before a benefit for lawn mowing, even though the two instances of lawn mowing outnumber the one instance of horse racing.

Matching benefits with the entire history of a user's activity encapsulates Valet's genuine innovation. The more the user is known by actions, the greater the value of the benefits. Valet can present these benefits to the user at a likely time of interest, or Valet can display these benefits on the Valet dashboard. The user can also, at any time, open the Valet dashboard, and view the benefits Valet determines to be most useful.

Benefits are not limited to the time a user is in front of the user's computer. It is a natural transition for Valet to work in both the online world, where the user is operating a computer, and the offline world, where the user is not operating a computer. For instance, if the user walked into a Starbucks coffee store, and wanted to purchase a coffee, and a coupon existed for the coffee, the user could access that coupon on the user's cell phone, send payment from the cell phone using the coupon through integration with a service such as Google's forthcoming Gpay, and receive a discount for the user's coffee purchase. Or, the user could have anticipated going to Starbucks, and printed a coupon before going. In any instance where user activity can be matched with a benefit in the online or offline world, Valet would be able to provide them with that benefit.

To keep Valet and its benefits current, Valet can connect through a network to a host computer to determine if any updates to any aspect of Valet exist, and download and implement the updates. Any aspect of Valet may include but is not limited to the plugin manager, plugins, user history, benefits, responses, algorithms, components or items.

A further natural transition is for the benefit to shift to an outcome, where an outcome is a benefit that requires additional activity to present to the user. For instance, if the user wanted to make a request to Valet, the user can open the Valet dashboard. The user can type in, "I want to go to Vegas next weekend." Valet can reference existing preferences to assemble desired types of hotels, rental cars, airline reservations and tickets for shows into an itinerary. The user can click Authorize, and is ready to go to Vegas. This outcome is not intended to limit the scope of the invention, but rather provide an indication of one application of the invention's usefulness. An outcome could be built for any desired functionality.

To classify functionality, outcomes can be organized as skills, where a skill is a certain type of outcome. For instance, a travel outcome could have a walking-tour skill optimized for walking tours in Europe. A research outcome could have a genealogy skill optimized for researching genealogy by country. A shopping outcome could have a clothing skill geared to selecting clothes for a good value. A user could purchase skills to extend Valet's functionality, or add skills of interest that were free. A skill could be built for any desired outcome.

Furthermore, a software development kit could be produced to enable a computer developer to create an outcome or skill that could integrate with the Valet plugin architecture. In this manner, Valet functionality could be augmented by plugins developed by third parties. A third party developer would be unable to access the user history or benefits or responses to protect the user's privacy, but the developer plugins would be able to perform desired tasks that a user specifically requested. Plugins could also be grouped together and available as a bundle for purchase or free.

At all times, a user's privacy is respected in any embodiment of the invention. The user has control over the user's information. The invention can only work with the user's consent.

Referring to FIG. 1, a computer system is shown to perform the method according to one embodiment of the present invention generally comprised of an input device such as a mouse 10, keyboard 20, or other input device 30 such as a microphone connected to a computer 40 connected to a display device 50. The computer system may be connected to a network 60 such as the Internet or some other wide area network (WAN) or local area network (LAN) which provides means for the computer system to access instructions or files present on computers connected through the network. An external device 70 such as a cell phone may also connect through the network 60 to extend the method to the external device. The external device 70 may also communicate directly with the computer 40, such as an iPod that connects to the computer. The external device 70 may also function as an input device. A software program residing on the computer 40 interprets user commands input through the input devices and presents results to the user on the display and/or the external device. The software program may also communicate over a network with other computers to receive and interpret user commands and present results to the user.

FIG. 2 is a flow chart that illustrates a method for a benefits services privacy architecture according to one embodiment of the present invention. A software program named Valet resides on the computer 40 and is launched by the computer operating system on startup. Valet.exe receives the message to start 80 and initiates the plugin manager 90. The plugin manager checks for plugins with which it can communicate. If no plugins exist, Valet exits 110, and no further action is taken by Valet. For each plugin that exists, Valet registers the plugin 120. Registration enables Valet to notify the plugin when the user performs a key activity 130.

Referring again to FIG. 2, Valet monitors user activity. If a key activity occurs 130, Valet adds the activity to the user history 140. The user history contains all key activity, content and analysis. The user history is likely stored on the computer 40, but may be stored on an external device 70 as well. Valet checks if the activity is to disable sentience 150. Sentience is the ability to monitor and respond to user activity. Valet can only monitor and respond to user activity with the user's consent. If the user disables sentience 150 and turns Valet off, Valet exits 160. With sentience off, no monitoring or response to user activity occurs, as if Valet has been removed from the user's computer. If the activity is something other than to disable sentience, Valet checks for a plugin registered to respond to the user activity 170. For instance, if the user activity is to open Microsoft Word, Valet checks for a plugin registered to respond to winword.exe launching. If no plugin is found to respond and the plugin manager has no response, Valet returns to checking for a key activity 130. If a plugin is found, Valet sends a message to the plugin to respond 180.

FIGS. 3A and 3B are a flow chart that details sentience according to one embodiment of the present invention. A user can turn sentience on or off at any time to control when Valet can monitor and respond to user activity. If the user turns sentience on, Valet sends the activate sentience message 190. A software programming mutex thread is instantiated and locked to allow priority access to computing resources. Valet checks to see if the user history exists 210. All key user activity is stored in the user history. If the user history file does not exist, then Valet creates it 220. If the user history file exists, Valet checks if an encryption key exists 230. If the encryption key exists, Valet loads the encryption key 280 into the mutex thread to encrypt and password-protect the user history.

Referring again to FIGS. 3A and 3B, if the encryption key does not exist, then the user is prompted to create a master password 240. If the user does not create a master password 240, Valet unlocks and kills the mutex thread 260 and exits 270. Sentience is off. Valet can only monitor and detect user activity if sentience is on, and the user has created a master password for the encrypted user history. If the user inputs a master password 240, Valet creates an encryption key 250. Valet loads the encryption key into the mutex thread 280 and encrypts the user history.

Referring again to FIGS. 3A and 3B, Valet monitors the list of system processes 290 currently running on the computer. Valet checks for any plugins registered to respond to the processes 300. If no plugins exist for any of the processes, Valet monitors for key user activity 310. For any plugins registered to respond to processes 300, Valet readies the plugins for response, and returns to monitor for key user activity 310. If a key activity is detected, Valet checks if the activity is to disable sentience 320. If sentience is disabled, Valet unlocks and kills the mutex thread 330 and exits 340. If sentience is enabled, Valet categorizes the activity and adds it to the user history 350. Valet checks if a response to the activity exists 360. If so, Valet records the response in the user history 370 and increments the response count 380. The response count provides a basis to establish user patterns and habits to match with benefits. Valet sends the message to respond to all registered plugins 390. If no response to the activity exists, Valet returns to monitoring for a key user activity 310. Essentially, if sentience is on, Valet waits for a key activity and responds.

FIG. 4 is a flow chart that demonstrates updating Valet to keep Valet current according to one embodiment of the present invention. As new programs and functionality become available to a computer user, the user may change computing activity. To keep current and relevant to a computer user, Valet may update component parts. In particular, benefits may be updated. Benefits such as a coupon may expire and need to be replaced. To account for this, Valet can query over a network 60 and determine if any part of Valet needs to be updated, similar to Norton AntiVirus' LiveUpdate feature. Valet can check for updates at periodic intervals, or a user can also initiate an update. If a user initiates an update, Valet receives the update Valet message 400. Valet checks if the computer is online 410. If not, Valet prompts the user to go online 420. If the user goes online, Valet checks to ensure that the computer is online 410. If the user does not go online, the update process exits 430.

Referring again to FIG. 4, if the computer is online, Valet checks if a server connection can be established. If no connection can be made, the update process exits 430. Valet remains as it is. If a connection can be made, Valet compares component time-date stamps 450. If the server component is more recent, Valet downloads and updates the component 460.

Referring again to FIG. 4, Valet checks to see if benefits have been updated 470. If benefits are the same, Valet sends the updated message 490. If benefits have changed, Valet cross-references the benefits with existing responses 480. For example, if a user marked a coupon for shampoo as intrusive, and a new coupon for shampoo exists, the user may also regard the new coupon as intrusive. Valet can avoid presenting the benefit. In this manner, Valet becomes increasingly adept at interacting with the user in a favorable manner. After cross-referencing completes, Valet sends the updated message 490.

FIG. 5 shows the general communication structure of the component parts of Valet according to one embodiment of the present invention. The plugin manager 500 routes communication among the user history 510, benefits 520, responses 530, and all plugins, represented by plugin 540 and plugin 550. If the plugin manager 500 detects a key activity, the plugin manager 500 can notify the plugin 540 to respond to the activity. The plugin can access the user history 510, benefits 520 and responses 530 through the plugin manager. The plugin 540 can also communicate with plugin 550 through the plugin manager, or communicate directly with plugin 550. Plugin 540 and plugin 550 can send and receive messages from each other. Plugin 540 and plugin 550 can also send and receive messages to and from each other and respond.

FIGS. 6A-C detail a Valet plugin according to one embodiment of the present invention. Upon startup, the plugin manager scans for all plugins 100. Each plugin receives the plugin startup message 560. The plugin registers with the application 570 for which the plugin can respond to key user activity. The plugin checks for successful application registration 580. If unsuccessful, the plugin exits 590. If successful, the plugin registers with the plugin manager 600. The plugin checks for successful plugin manager registration 610. If unsuccessful, the plugin exits 590. If successful, the plugin is registered with the plugin manager 120. The application, plugin manager, and plugin can now communicate.

Referring again to FIGS. 6A-C, the plugin checks if Valet sentience is on 630. If Valet sentience is off, no activity can occur, and the plugin exits 590. If Valet sentience is on, the plugin checks if sentience for the plugin is on 630. A user can leave all other aspects of Valet sentience on, but turn off sentience for a specific plugin while in an application. For instance, a user can turn off an email plugin before writing an email. After the email is written, the user can turn the plugin back on. If plugin sentience is off, the plugin exits 590. If plugin sentience is on, the plugin stores the user opening the application 640. The plugin can now check for key activity within the application 650.

Referring again to FIGS. 6A-C, the plugin can respond to detected key activity. The plugin adds the activity to the user history 660. The plugin can access the user history through the plugin manager 500. The plugin checks if the activity is to disable Valet sentience 670. If it is, the plugin exits 680. The plugin checks if the activity is to disable plugin sentience 690. If it is, the plugin exits 680. The plugin checks if the activity is to close the application 700. If it is, the application closes 710. The plugin sends the application closed message 720. The plugin shuts down 730, cleans any allocated memory and exits.

It should be noted that plugins are typically matched with an application, such as a Microsoft Word plugin for Microsoft Word. However, a plugin can certainly function as its own application. An application plugin can construct a user interface, receive commands from the user, detect key activities and respond, and interact with the plugin manager, user history, benefits, responses, and other plugins.

FIGS. 7A and 7B are a flow chart espousing the Valet dashboard according to one embodiment of the present invention. To conveniently access Valet components such as plugins, benefits and user history, a user can open the Valet dashboard. Valet receives the message to open the dashboard 820. Valet creates a workspace to display the Valet components 830. For instance, a user may not want to wait for Valet to present benefits based upon activity. A user may want to see the benefits Valet has to offer. A display area can be constructed for benefits, and populated along with all other components 840. The user opening the dashboard is recorded in the user history 850.

Referring again to FIGS. 7A and 7B, the user may have marked a benefit as useful at a later time. Valet can check to see if any benefits are waiting to be presented to the user 860. If no benefits are waiting, Valet can wait for a user command 950. If benefits are waiting, Valet can present the benefits to the user 870, elicit feedback on the benefits 880 and check if the user provides any response 890. If the user responds, Valet can store the response 900 and record the user activity 910. If no response exists, Valet can record the user activity 910 of viewing the benefits.

Referring again to FIGS. 7A and 7B, Valet can enact any selected benefit 920. For instance, if the benefit is an ad for insurance, and the user clicks on the ad, Valet can open a browser, inform the ad provider that the ad was clicked, populate any common information stored in the user history such as billing and shipping address information, and scroll down for the user to reveal the Submit button to make the purchase. If the user clicks Submit, Valet can inform the provider of the benefit of the purchase, and receive a percentage of the sale. Valet records the user activity in the user history 930. Valet incorporates the recent benefit selection into a ranking of benefits 940. Similar and/or related benefits receive a higher score. The user can then view benefits most likely of interest.

Referring again to FIGS. 7A and 7B, Valet waits for a user command 950. Valet enacts the user command 960 and checks if the user command is to close the dashboard 970. If so, Valet closes the dashboard 990 and sends the dashboard closed message 1000. If not, Valet records the user activity 980 and waits for another user command 950.

FIGS. 8A-C are a flow chart that illustrates the user editing the user history according to one embodiment of the present invention. To give the user control over the user's information, the user can edit or delete the user history at any time. A common concern with a computer user is that a site such as Google will gather information on the user. The user has no idea what information has been gathered, no ability to edit that information, and no way to control how that information will be used. Valet addresses this concern by giving the user control over the user's information. All the user history is available for inspection the user at any time. The user can send the dashboard the edit user history message, and Valet receives the message 1010. Valet checks if the user history exists 1020. If not, Valet creates a user history file 1030. Valet sets the default settings for viewing the user history 1040 such as viewing user activity chronologically instead of by category. Valet sets the saved normally boolean to true 1050. Valet prompts for the master password 1060 the user has to provide to access the user history.

Referring again to FIGS. 8A-C, if the user history exists, Valet prompts for the master password 1060. If the master password is incorrect, Valet exits 1070. This protects the privacy of the user. If the user forgets the master password, the user has to start from scratch the process of becoming known by Valet. If the user provides the password, Valet checks if the password is valid 1080. Valet checks for stored preferences 1090 on user history viewing. If no preferences exist, Valet loads the default settings 1100. If preferences exist, Valet loads those 1110. Valet sets the changed boolean to false 1120 to track changes to the user history. Valet checks for a user command 1130.

Referring again to FIGS. 8A-C, Valet checks if the user command is a change 1140 such as editing or removing a user history entry. If the command is a change, Valet sets the changed boolean to true 1150. Valet creates an encrypted temp file 1160 and saves the changes in the temp file 1170. By saving changes to a temp file, the user has the option to restore the user history to its original state. Valet then returns to monitoring for a user command 1130. If the command is not a change, Valet checks if the command is to exit 1180. If the command is not to exit, Valet checks if the command is to save 1190. If the command is not to save, Valet returns to monitoring for a user command 1130. If the command is to save 1190, Valet checks if the changed boolean is true 1200. If changed is true, Valet knows that at least one change has been made, and the user history is to be overwritten by the temp file 1210. The saved normally boolean is set to true 1220, and Valet returns to monitoring for a user command 1130. If changed is false, Valet returns to monitoring for a user command 1130. If the command is to exit, Valet checks to see if changed is true 1230. If changed is true, the user is prompted to save changes 1240. If the user chooses to save changes, the user history is overwritten by the temp file 1250. If the user does not choose to save changes, the temp file is deleted 1260, the saved normally boolean is set to true 1270, and the exit edit user history message is sent 1280. If changed is false, the temp file is deleted 1260, the saved normally boolean is set to true 1270, and the exit edit user history message is sent 1280.

FIGS. 9A-G are a flow chart that illustrates the benefit of presenting only desired emails, or eliminating spam, to the user according to one embodiment of the present invention. When a user opens email to check email, the plugin manager 500 recognizes the key user activity of preparing to check email, and sends the message to the email plugin to identify desired email 1290. The plugin checks if a user preference exists for updating the user on progress and activity as the plugin identifies desired email 1300. If a preference exists, the plugin presents or hides the desired display and detail according to the user preference 1310. If no preference exists, the plugin shows the standard display and detail of progress and activity 1320. The plugin sends a message to the plugin manager to obtain the list of authorized email addresses, authorized email domains, blocked email addresses, and blocked email domains contained in the user history 1330. The plugin then intercepts unread email before the email is shown to the user 1340. If the user has specified, the user is informed of activity and progress as each email is identified as valid or spam.

Referring again to FIGS. 9A-G, the plugin determines if the email has already been marked by another source such as Yahoo Mail or Norton AntiSpam as valid or spam 1350. If so, then email marked as spam is inspected for a false positive (fp) where the email marked as spam is actually valid and of interest to the user. If an fp is from an authorized email address contained in the authorized email addresses list 1360, the email is marked as valid 1370. With Yahoo Mail, the IsSpam flag is changed from 1 to 0. With Norton AntiSpam, the email is moved out of the Norton AntiSpam folder into the Inbox folder. Other email programs can be addressed on an individual basis. The principle is to determine how the program marks an email as spam and valid, and change the email to valid.

Referring again to FIGS. 9A-G, the plugin checks if the email is from an authorized domain and contains at least one hyperlink 1380. If a link is present, the link is parsed to determine the link in the domain, for instance, yahoo.com. If each link domain matches the email domain 1390, the email is marked as valid 1410. A spammer tries to send the user to a site the spammer is advertising. A valid email from a creditable site will send the user to that same site. If the email domain name and link domain name differ, the email remains as spam 1410.

Referring again to FIGS. 9A-G, the plugin checks if the email originates from an authorized domain name and contains only text 1420. If so, the email is subjected to standard spam filtering techniques including but not limited to keyword, ip address, country of origin, character set and association with known spam servers updated in real time on Internet blackhole lists. If the email clears these filters, the email is matched with the user history. Since the user history contains all key activity performed by the user, and content associated with that key activity, the user history provides the ultimate source to identify spam. Without this knowledge, spam can only be addressed on a case-by-case basis, or in the context of other accepted email, a partial picture of the user's scope of interest at best. Standard anti-spam programs fail to accurately identify spam because they lack the ability to access and interface with the user history. With the user history, though, identifying spam becomes straightforward. The content of the spam is treated as if the user had written the content, and benefits are to be assigned to the content. The content of the email is analyzed and assigned reference tags 1440. The reference tags are matched against the reference tags in the user history 1450. If no reference tags can be assigned to the email due to content purposefully mangled to the point where a human being can barely glean what the spammer is trying to communicate, no match exists between the email and the user history. There are no reference tags for the email to match. The email is spam. If reference tags can be assigned, but differ from all reference tags in the user history, the email is spam. If reference tags can be assigned, and match reference tags in the user history, the email is valid 1460.

Referring again to FIGS. 9A-G, if a reference tag match between the email and user history is ambiguous, then the plugin is unsure 1470. For instance, the user may have researched stocks, and receive an email touting the merits of a weekly stock research report. If unsure, the plugin prevents the email in question from reaching the user's inbox, and instead sends a confirmation email to the user containing a password 1480. The email sender can receive this email and respond by keying in the password. If a response is received 1490 and the password matches, the email is marked as unsure 1500, typically within the subject of the email, and presented to the user. If no response is received or the password does not match, the email remains as spam 1510.

Referring again to FIGS. 9A-G, for an unsure email, the user can specify to block or allow the email 1910. If the user reads 1920 and blocks the email 1930, the email address is added to the list of blocked addresses 1940. If the user allows the email 1950, the email address is added to the list of authorized addresses 1960. Allowed email reference tags and content are added to the user history 1970 to expand the reference base for future analysis. This enables Valet to become increasingly adept at reducing the number of unsure emails as time progresses.

Referring again to FIGS. 9A-G, the plugin checks if the email is from an authorized domain and contains at least one attachment 1520. Because opening a malicious attachment can damage a user's computer, special care is taken in an email containing an attachment from an address outside of the authorized list. The plugin subjects the email and each attachment to standard anti-spam filtering techniques 1530. If the plugin and each attachment clear these filters 1530, the email and each attachment are matched against the user history. Reference tags are assigned 1540 and compared with the user history reference tags 1550. If an outright match exists, because of the presence of an attachment, the email is marked as unsure. A confirmation email is sent 1570, and if confirmation is received 1580, the email is presented to the user marked as unsure. The user can block or allow the email 1910. If the reference tag match results in an unsure evaluation 1560, a confirmation email is sent 1570. If confirmation is received 1580, the email is presented to the user as unsure 1590. If no confirmation is received, the email remains as spam 1600. If no match exists, the email remains as spam 1600. All remaining emails, such as emails containing at least one picture, are marked as spam 1610.

Referring again to FIGS. 9A-G, email is now inspected that is marked as valid, or unmarked. If the user had no program that scanned for spam, the plugin would commence email identification at this point 1620. There would be no false positives to inspect. If the email is from an authorized address 1630, the email is marked as valid 1640. If the email is from a blocked address 1650, the email is marked as spam 1660. If the email is from an authorized domain name and contains at least one link 1670, the email domain name and each link domain name are compared 1680. If the email and link domain names match, the email is valid 1690. If they differ, the email is spam 1700.

Referring again to FIGS. 9A-G, if the email contains text only 1710, the email is put through standard anti-spam filters 1720. If the email passes the filters, reference tags are assigned to the email 1730 and matched with the user history reference tags 1740. If a clear match exists, the email is marked as valid 1750. If the plugin is unsure about a match, a confirmation email 1770 is sent. If the email sender confirms the email 1780, the email is presented to the user as unsure 1790. If the email sender does not confirm the email, the email is likely from a spammer and marked as spam 1800. If no match exists with the user history or no reference tags can be assigned due to unrecognizable content, the email is marked as spam 1800.

Referring again to FIGS. 9A-G, if the email contains at least one attachment 1810, the email and each attachment are filtered by standard anti-spam measures 1820. If the email and each attachment survive the filters, the user history match commences. Reference tags are assigned to the email and each attachment 1830. If a match exists 1840 or if the match is unsure 1850, a confirmation email is sent 1860. If confirmation is received 1870, the email is marked as unsure 1880 and presented to the user. If no match exists, or no confirmation is received, the email is marked as spam 1890.

Referring again to FIGS. 9A-G, all remaining email is presented to the user. The user can specify within the email listing row, subject, and email body whether to block or allow the email 1910. For instance, a user may receive an email from an authorized email address that contains a group mailing, but no longer want to receive emails from that particular group. The user can block the email 1930, and the email address is removed from the authorized email addresses list and added to the blocked email addresses list 1940. If the user allows an email 1950 that has been identified as spam or marked as unsure, the email address is removed if present on the blocked addresses list and added to the list of authorized email addresses 1960. The email content and assigned reference tags are added to the user history 1970 to reflect the user's interest in the email and provide a basis to recognize future similar content. The plugin sends Valet the desired email identified message 1980.

FIGS. 10A and 10B show a flow chart that shows matching benefits to a user activity according to one embodiment of the present invention. The plugin manager 500 detects a key user activity and sends a message to a plugin to match benefits to the user activity 1990. It should be noted that another plugin could detect the key activity and send a message to match benefits, or a plugin could detect key user activity and send itself the message to match a benefit to a user activity. Upon receiving the message to match benefits, the plugin checks if any benefits are waiting for the user 2000. If a benefit is determined while the user is working, presenting the benefit would interrupt the user. Rather than risk incurring the ire of the user, benefits can accumulate and wait for an opportune presentation time, such as a user opening an application. If waiting benefits exist, the benefits are presented to the user 2010. The user can specify if the benefit is useful, useful at a later time, intrusive, or some other form of feedback 2020. If the user responds 2030, the response is stored 2040 in the responses file along with the benefit 2050 corresponding to the response. This enables future benefits to be checked for similar responses to learn how the user prefers communication. If the user marks a benefit as intrusive when a program is opened, and the user opens the program again, rather than present another benefit, the plugin can wait to present benefits until another time. This gives the user control over when the user receives benefits. Overall, the user experience will be more favorable if the user receives the right benefit at the right time. Recording responses and benefits enables Valet to learn the user's preferences on benefits and when to present them.

Referring again to FIGS. 10A and 10B, current benefits are searched to match with the user activity 2060. For instance, if a coupon exists with an expiration date, and the coupon is current, then the coupon is eligible to present to the user. If no current benefits exist to match with the user activity, the benefits match exits 2070. If current benefits exist, they are ranked by likely interest to the user 2080. Just as search engine results are ranked according to percentage relevance, benefits can be ranked according to closest match.

Referring again to FIGS. 10A and 10B, the highest ranked benefits are referenced against the responses file to see if a response exists for a similar benefit. If a previous response for all similar benefits has been marked as intrusive or prohibited 2090, then the selection of prohibited benefits is recorded in the user history 2100 to guard against future benefits selection. The benefits match exits 2110. If a particular benefit has been prohibited 2120, then the selection of a prohibited benefit is recorded in the user history 2130. The benefit match exits for that particular benefit 2140.

Referring again to FIGS. 10A and 10B, any remaining benefits are checked to see if they can be presented 2150. If the user is busy, or no appropriate time to present benefits is detected, the benefits are marked for presentation at a later time 2160. If an appropriate time to present benefits such as closing an application is detected, then the benefits are presented. It should be noted here the difference between Valet's approach of presenting a benefit and typical advertising such as a pop-up window. If a pop-up window suddenly obscures the user's view of an Internet page, the user likely has no way on the pop-up window to specify to block that pop-up and any similar pop-ups going forward. Often, the user becomes increasingly annoyed at the intrusive blockage of a process the user was previously enjoying. This can be contrasted with Valet, where the user is in complete control of when a benefit is presented to them. If a user views a benefit as intrusive, then Valet does not present a similar benefit at a similar time to the user going forward. The user can control the times eligible for presentation of a benefit, and can block or allow benefits by category. The user can receive useful benefits at the right times, and block other benefits at other times. Valet can learn the user's preferences by presenting benefits to the user 2170, eliciting feedback from the user on the benefit 2180, checking for a response 2190, storing a user response 2200, and recording the presented benefit 2210 in the user history.

Referring again to FIGS. 10A and 10B, remaining benefits can be ranked according to the new data of a benefit being selected 2220. User patterns and habits of benefit selection can be analyzed and established. Recent benefit selection can be factored in as freshness to determine benefits most likely to interest the user. These benefits can receive priority as candidates for presentation to a user. The more benefits the user selects, the better Valet becomes at presenting useful benefits. After factoring the most recent benefit selection into the benefits ranking, the plugin sends the benefits matched to user activity message 2230.

FIG. 11 is a flow chart providing an example of how benefits are matched with user activity according to one embodiment of the present invention. At periodic intervals, the user history is sorted to aid in determining useful benefits. A sorting plugin receives the determine benefits for user history message 2240. The user history content is grouped by reference tags and formatted as html 2240. In essence, the user history is turned into a website, where grouped content is a page on the website. Algorithms such as Google AdSense that match html content with advertising 2260 can then be applied to the sorted user history. The resultant AdSense ads and text can be added as reference tags for the user activity and content 2270. These reference tags are matched with the reference tags for benefits 2270, and/or the AdSense ads can serve as the benefits.

Referring again to FIG. 11, another algorithm such as Google's AdWords is applied to the user history 2280 to obtain benefits likely of interest to the user. The reference tags for the user history activity and content are modified to include the AdWords ads and text 2290. The user history reference tags are matched with the benefits reference tags 2300, and/or the AdWords ads function as the matching benefits. Matching benefits are stored in the user history to provide convenient and quick access to benefits likely of interest to the user 2310. These benefits are ranked 2320 by probable interest to the user. The plugin sends the Google benefits determined message 2330.

It should be noted that other algorithms can be used to match content with benefits, such as algorithms used by Yahoo and Microsoft Windows Live to determine advertising likely of interest to a user based upon the content the user views. However, instead of a single webpage, the algorithms are applied within the context of the entire user history.

FIG. 12 is a flow chart illustrating sorting the user history to group related content according to one embodiment of the present invention. Grouping related content enables user habits and patterns to be established. Without grouping, patterns become extremely difficult to identify. Disparate activity such as cycling, listening to music and scientific journal reading can appear at random, interspersed with a stock quote, a search on Lance Armstrong, and a search on the Beatles. Asking an advertising algorithm to make sense of this is impractical. However, if Lance Armstrong and cycling are grouped together, and Beatles and listening to music are grouped, and a scientific journal with an Intel stock quote are grouped, a picture of the user begins to emerge. A benefit on coverage of the Tour de France for cycling and Lance Armstrong, a promotion for iTunes on music and the Beatles, and an ad for the technology section of the online version of the Wall Street Journal for articles on technology stocks can be presented. Just as a webpage that contains related content can enable an advertising algorithm to provide meaningful results, the user history can, provided it is sorted. As such, at periodic intervals, a sorting plugin receives the sort user history message 2340. User activities are grouped by reference tags 2350. A lexicon or other word associations enables like tags to be identified and collected. Benefits reference tags are then compared with the user history reference tags 2360, and assigned a priority 2370 according to the degree of match.

Referring again to FIG. 12, the predominance of user activity groupings will indicate areas of interest to the user 2380. For example, the more a user reads about technology, the more likely the user will want a benefit for a high-definition TV than for following the next Tour de France. However, if the user has twice recently searched for information on the Tour de France, even though the amount of entries for technology may eclipse the Tour de France, the user has recently acted on the Tour de France. As such, the user might want a benefit for a composite bicycle presented before a benefit for a high-definition TV. The plugin can accordingly rank benefits according to freshness and areas of activity 2380, match benefits to the highest priority user activities 2390, collect the benefits into one location to expedite benefits retrieval 2400, store the benefits to present to the user 2410, and send the user history sorted message 2420.

Valet is then prepared to present benefits to the user at the next appropriate time. FIGS. 13A and 13B show a flow chart demonstrating an outcome according to one embodiment of the present invention. An outcome is a benefit that requires additional work to perform before the benefit can be presented to a user. An example is selecting an itinerary for a user based upon previous user selections stored in the user history. An outcome plugin receives the produce outcome message 2430. The plugin parses the outcome request and determines how to proceed 2440. For instance, if the user keys in, "I want to go to Vegas this weekend," the plugin determines that the travel outcome is to be used. The plugin checks if the outcome functionality exists 2450 in Valet. If the functionality does not exist, for instance, the user has typed, "I want to go to Pluto," Valet exits 2460. If the functionality exists, the plugin checks if the outcome functionality is obtained and active 2470. The outcome may be available for a fee, and the user may have yet to purchase the outcome. If the user does not want to proceed, the plugin exits 2460. If the functionality is active, the plugin proceeds to perform the outcome 2480.

Referring again to FIGS. 13A and 13B, the steps to perform for the outcome will depend on how the plugin is programmed to respond. In the example of going to Vegas this weekend, the plugin establishes the dates of the weekend, and looks in the user history for user preference for hotel type, airline ticket, rental car, and possible shows of interest. The plugin queries hotel, airline, rental and ticketing sites for availability, and selects options according to user preferences. The plugin may also contact a travel site, and select options. The plugin presents the outcome, in this case a selected itinerary, to the user 2490. User feedback is elicited 2500, and any response is stored in the responses file 2520. The user activity of receiving the outcome is recorded in the user history 2530. If the user is pleased with the outcome, in this case an itinerary, the user can click Authorize. The plugin checks if any authorized purchases are to be made 2540. The plugin can enact authorized purchases 2550 using the user's billing information contained in the encrypted and password-protected user history. The provider of Valet can receive a commission for this service and/or a percentage of the sale. The user activity of authorizing purchases is recorded 2560, and the outcome performed message is sent 2570. Instead of having to go to several sites and repeatedly enter information, the user keys in wanting to go to Vegas over the weekend, and clicks Authorize. Valet handles everything else, as a skilled personal assistant would do.

FIG. 14 shows a computer readable media 2580 that contains the Valet program 2590 according to one embodiment of the present invention. The program resides on the computer readable media, and may be obtained through procuring the computer readable media containing the program. The program can also be delivered over a network 60 to a computer 40, and stored on computer readable media on the computer. This enables the program to be delivered electronically to a user, or transported by the user to another computer or device on which Valet can function.

FIG. 15 depicts a computer system 2600 that can be used to perform the method according to one embodiment of the present invention. The computer system 2600 consists of a user interface 2610, a central processing unit (CPU) 2620, a data storage unit 2630, a memory unit 2640, input/output support 2680 for communicating through a network 2690 such as the Internet or some other WAN or LAN, and one or more buses to route communication among the system components 2670. The memory unit 2640 may store the computer operating system 2650 and programs 2660 including the Valet program according to one embodiment of the present invention. The memory unit 2640 and the Valet program 2660 may interface with the data storage unit 2630 to store data such as the user history and benefits and responses files and/or computation results involving the user history, benefits and responses files. The computer system 2600 can access a server 2700 containing Valet program components 2710 through a network 2690 to update or replace Valet components. The Valet program 2660 for a benefits services privacy architecture comprises coded instructions which, when performed by the CPU 2620, result in the computer system 2600 executing the method for a benefits services privacy architecture according to exemplary embodiments of the present invention as summarized above.

I claim:

1. A method of presenting benefits to a user of a computing device, comprising:
    detecting user activities via a computer program executed on the computing device, the user activities detected by a plug-in module associated with an application program and configured to communicate with the computer program and the application program;
    storing a list of detected user activities in a user history in the computing device;
    receiving a list of predefined benefits from at least one remote server, each of the predefined benefits including an associated trigger user activity;
    storing the list of predefined benefits in the computing device;
    determining a predefined benefit to present to the user based at least on the presence of a trigger user activity detected by the plug-in module for the predefined benefit in the user history, via the computer program in the computing device; and
    presenting a matched predefined benefit to the user;
    wherein determining a predefined benefit to present to the user and presenting a matched predefined benefit to the user are performed in the computing device without transmitting information regarding the user activities to a remote server.

2. The method of claim 1, further comprising encrypting and password-protecting the user history.

3. The method of claim 1, further comprising enabling the user to view, edit, or delete the user history.

4. The method of claim 1, wherein the computer program is executed by a user's command.

5. The method of claim 4, further comprising sharing revenue between a benefit presenter that operates a third party server that serves benefits, and a benefit provider.

6. The method of claim 1, wherein detecting the user activities includes receiving a notice of a predefined user activity in the application program from the plug-in module.

7. The method of claim 1, wherein the plug-in module is one of a plurality of plug-in modules, each being associated with a respective application program, and configured to send notifications of predefined user activities in each of the application programs to the computer program.

8. The method of claim 1, further comprising:
assigning a user activity reference tag to each of the user activities; and
assigning a benefit reference tag to each of the benefits;
wherein determining a predefined benefit to present to the user includes cross-referencing user activity tags and the benefit tags to determine a match between a user activity and a benefit.

9. The method of claim 8, further comprising:
receiving a user response to the presented benefit; and
assigning a response reference tag to the user response, wherein the response reference tag is associated with the benefit reference tag so that the benefits are matched with a response with the same reference tag for an appropriate presentation to the user.

10. The method of claim 1, wherein determining the predefined benefit to present to the user comprises matching a set of user activities with the predefined benefit.

11. The method of claim 1, wherein the benefit is selected from the group consisting of an offer for a deal, discount, coupon, promotional code, advertising, information, knowledge, computer program, functionality, software, hardware, product, component, or item.

12. The method of claim 1, wherein the user activity is to check emails and the benefit is to eliminate spam to present desired emails to the user.

13. The method of claim 12, wherein the benefit further includes reducing false positive emails.

14. The method of claim 1, wherein the user activity is to organize work and the benefit is to group the work to facilitate work retrieval, editing, viewing and deletion.

15. The method of claim 1, wherein the user activity is an undesired result in performing work and the benefit is to offer a solution to perform the work.

16. The method of claim 1, wherein the user activity is to request a desired outcome for a task to be performed, the task is undertaken, and the result presented to the user.

17. A system for presenting benefits to a user of a computing device, comprising:
a user history data store to record a user history including a list of user activities detected via a computer program in the computing device;
a benefit data store to record a list of predefined benefits received from at least one remote server, each of the predefined benefits including an associated trigger user activity; and
a plug-in module associated with an application program, the plug-in module being configured to detect a trigger user activity occurring in an associated application program, and to send a notice of the trigger user activity to the computer program, for storage in the user history;
wherein the computer program in the computing device is configured to determine a predefined benefit to present to the user based at least on the presence of the trigger user activity for the predefined benefit in the user history, and is configured to present a matched predefined benefit to the user; and
wherein determining a predefined benefit to present to the user and presenting a matched predefined benefit to the user are performed in the computing device without transmitting information regarding the user activities to a remote server.

18. The system of claim 17, further comprising:
a response data store to record user responses to presented benefits;
wherein the computer program is configured to determine a predefined benefit to present to the user based additionally on the stored user responses.

19. A method of presenting benefits to a user of a computing device, comprising:
detecting user activities via a computer program executed on the computing device, wherein the user activities are detected by a plug-in module associated with an application program and configured to communicate with the computer program and the application program;
storing a list of detected user activities in a user history in the computing device;
receiving a list of predefined benefits from at least one remote server, each of the predefined benefits including an associated trigger user activity;
storing the list of predefined benefits in the computing device;
determining a predefined benefit to present to the user based at least on the presence of a trigger user activity for the predefined benefit in the user history, via the computer program in the computing device;
presenting a matched predefined benefit to the user;
receiving a user response to the presented benefit and storing the user response; and
presenting a newly matched benefit to the user based on a previous user response to a similar benefit;
wherein determining a predefined benefit to present to the user and presenting a matched predefined benefit to the user are performed in the computing device without transmitting information regarding the user activities to a remote server.

* * * * *